(12) United States Patent
Hashizume et al.

(10) Patent No.: US 6,375,328 B2
(45) Date of Patent: *Apr. 23, 2002

(54) OPTICAL MODULATION ELEMENT AND PROJECTOR

(75) Inventors: Toshiaki Hashizume, Okaya; Shinji Haba, Shiojiri; Motoyuki Fujimori, Suwa, all of (JP)

(73) Assignee: Seiko Epson Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/230,084

(22) PCT Filed: May 19, 1998

(86) PCT No.: PCT/JP98/02201

§ 371 Date: Jan. 19, 1999

§ 102(e) Date: Jan. 19, 1999

(87) PCT Pub. No.: WO98/53365

PCT Pub. Date: Nov. 26, 1998

(30) Foreign Application Priority Data

May 20, 1997 (JP) ............................ 9-130093
Dec. 1, 1997 (JP) ............................ 9-330619

(51) Int. Cl.⁷ ............................................. G03B 21/26
(52) U.S. Cl. ................................................... 353/30
(58) Field of Search ......................... 349/56, 57, 58; 353/31, 38, 60, 30

(56) References Cited

U.S. PATENT DOCUMENTS

| | | | | |
|---|---|---|---|---|
| 5,212,573 A | * | 5/1993 | Yamazaki | 359/54 |
| 5,508,834 A | * | 4/1996 | Yamada et al. | 359/83 |
| 5,743,611 A | * | 4/1998 | Yamaguchi et al. | 353/31 |
| 5,865,521 A | * | 2/1999 | Hashizumi et al. | 353/38 |
| 5,868,485 A | * | 2/1999 | Fujimori et al. | 353/119 |

FOREIGN PATENT DOCUMENTS

| | | |
|---|---|---|
| EP | 0 768 556 A | 4/1997 |
| EP | 0769 714 A | 4/1997 |
| EP | 0 916 988 A1 | 5/1999 |
| JP | A-6-258637 | 9/1994 |
| JP | 7-26223 | 1/1995 |
| JP | A-7-26223 | 1/1995 |
| JP | 8-262432 | 10/1996 |
| JP | A-8-262432 | 10/1996 |
| JP | A-9-105901 | 4/1997 |
| JP | A-9-113906 | 5/1997 |

* cited by examiner

Primary Examiner—Safet Metjahic
Assistant Examiner—E P LeRoux
(74) Attorney, Agent, or Firm—Oliff & Berridge PLC

(57) ABSTRACT

Liquid crystal modulation elements are arranged so that light outgoing surfaces thereof face light incident surfaces of a color synthesizing prism. Transparent plates are bonded to the light outgoing surfaces of the liquid crystal modulation elements. For this reason, adhesion of dust to the light outgoing surfaces of the liquid crystal modulation elements can be prevented. Further, it is possible to prevent light reflection at the interface surface between the light outgoing surfaces and air due to the difference in refractive index therebetween. This allows a high-quality image to be projected without deteriorating the switching characteristic of the liquid crystal modulation elements while preventing dust from adhering to the light outgoing surfaces of the liquid crystal modulation elements.

30 Claims, 16 Drawing Sheets

(CROSS SECTION TAKEN ALONG A-A)

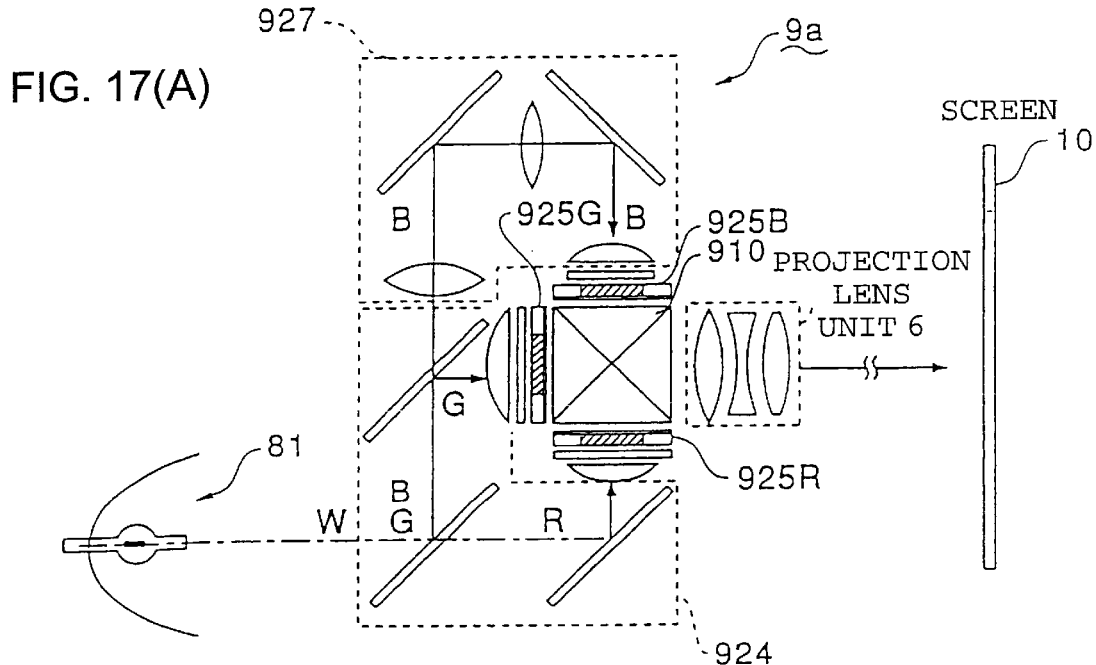
FIG. 17(A)
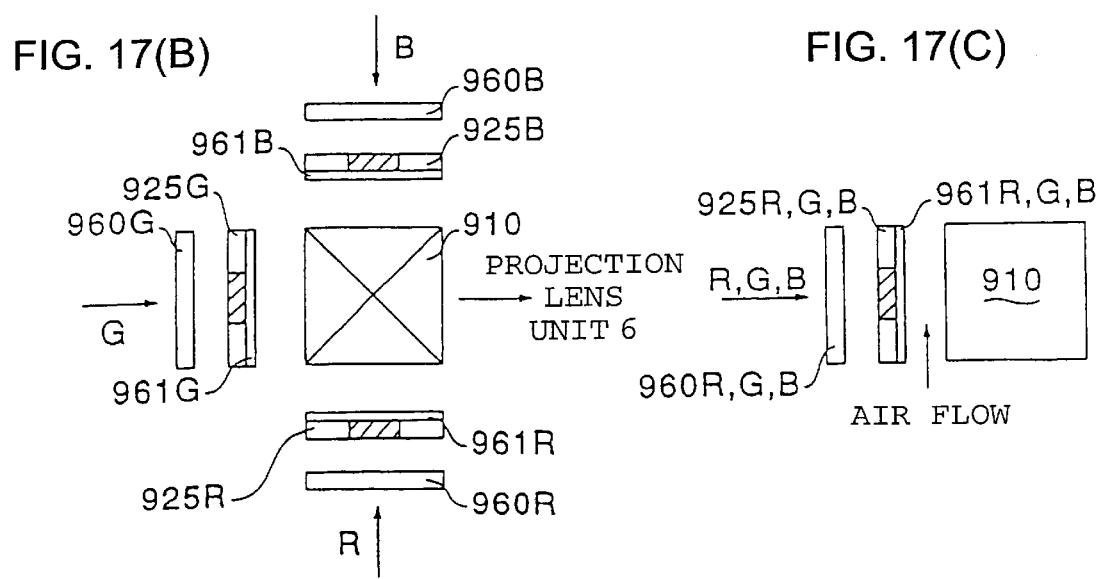
FIG. 17(B)
FIG. 17(C)

OPTICAL MODULATION ELEMENT AND PROJECTOR

BACKGROUND OF THE INVENTION

1. Field of the Invention

The present invention relates to an optical modulation element and a projection display device. More particularly, the present invention relates to a layout structure of optical elements on the periphery of an optical modulation element that modulates a light flux according to image information.

2. Description of Related Art

A projection display device basically consists of a light source lamp unit, an optical unit for optically processing a light flux emitted from the light source lamp unit so as to synthesize a color image corresponding to image information, a projection lens unit for enlarging and projecting the synthesized light flux onto a screen, a power supply unit, and a circuit substrate on which a control circuit and the like are mounted.

FIGS. 17(A)–(C) schematically show the construction of the optical unit and the projection lens unit of the above-mentioned components. As shown in this drawing, an optical system of an optical unit 9a includes a lamp body 81 serving as a light source, a color separation optical system 924 for separating a light flux W emitted from the lamp body 81 into respective color light fluxes R, G and B of the primary colors of red (R), green (G) and blue (B), three sheets of liquid crystal modulation elements 925R, 925G and 925B for modulating the separated respective color light fluxes according to image information, and a color synthesizing prism 910 in the shape of a prism with a square cross section to synthesize the modulated color light fluxes. The light flux W emitted from the lamp body 81 is separated into respective color light fluxes R, G and B by the color separation optical system 924 including various types of dichroic mirrors, and the red and green light fluxes R and G of the respective color light fluxes are emitted from outgoing sections provided in the color separation optical system 924 towards corresponding liquid crystal modulation elements 925R and 925G. The blue light flux B is guided to the corresponding liquid crystal modulation element 925B via a light guide system 927, and is emitted from an outgoing section provided in the light guide system 927 towards the corresponding liquid crystal modulation element 925B.

As shown in FIGS. 17(B) and 17(C) in enlargement, in the optical unit 9a, polarizers 960R, 960G and 960B are respectively arranged on the side of incident surfaces of the liquid crystal modulation elements 925R, 925G and 925B so that they unify the planes of polarization of the respective color light fluxes to be incident on the liquid crystal modulation elements 925R, 925G and 925B. In addition, polarizers 961R, 961G and 961B are respectively arranged on the side of outgoing surfaces of the liquid crystal modulation elements 925R, 925G and 925B so that they unify the planes of polarization of the modulated color fluxes to be incident on the color synthesizing prism 910. The actions of these polarizers allow an enlarged image excellent in contrast to be projected onto the surface of a screen 10. Of the two polarizers that sandwich the liquid crystal modulation elements 925R, 925G and 925B, the polarizers 961R, 961G and 961B positioned on the side of the outgoing surfaces of the liquid crystal modulation elements 925R, 925G and 925B are bonded to the light outgoing surfaces of the liquid crystal modulation elements.

Incidentally, as the liquid crystal modulation elements 925R, 925G and 925B, an active matrix-type liquid crystal device is generally used, in which pixels arranged in the form of a matrix are controlled by a switching element.

Here, in order to improve the contrast of an image enlarged and projected onto the screen 10, it is effective to bond a polarizer, which has high selection properties with respect to polarized light, to the light outgoing surface of each of the liquid crystal modulation elements 925R, 925G and 925B. However, such a polarizer having high selection properties absorbs much light and therefore, generates much heat. Inside the projection display device mentioned above, an air flow is formed as shown in FIG. 17(C) and cools the polarizer. However, since the polarizer is directly attached to the light outgoing surface of the liquid crystal modulation element, heat is apt to be transmitted to the liquid crystal modulation element, and to thereby increase the temperature of the liquid crystal modulation element. This increase in temperature deteriorates the optical properties of a liquid crystal panel, and the image contrast.

Thus, it may be possible to arrange the polarizer apart from the light outgoing surface of the liquid crystal modulation element. However, if the polarizer is simply arranged apart from the light outgoing surface, there is a fear that the switching element in the liquid crystal modulation element may malfunction due to a light beam reflected by the light outgoing surface of the liquid crystal modulation element. In addition, there is a fear that dust or the like may be caused by an air flow formed inside the projection display device to adhere to the light outgoing surface of the liquid crystal modulation element, and it may make high-quality image projection impossible.

SUMMARY OF THE INVENTION

In view of the above-described points, an object of the present invention is to provide an optical modulation element and a projection display device that achieve high-quality image projection by preventing dust from adhering to the light outgoing surface of the optical modulation element without deteriorating the switching characteristic of the optical modulation element.

In order to achieve the above-described object, there is provided an optical modulation element for modulating a light flux emitted from a light source according to image information, wherein a transparent plate is provided on at least one surface thereof, and the space between the transparent plate and the optical modulation element is shielded from the outside by a dust-preventing member.

In such an optical modulation element, heat generated by a polarizer to be transmitted to the optical modulation element can be further reduced. In addition, since the space between the transparent plate and the optical modulation element is shielded from the outside by the dust-preventing member, dust does not enter the space. For this reason, negative effects, such as the light flux emitted from the optical modulation element being scattered by dust, can be solved.

The dust-preventing member may preferably be formed of resin containing glass fiber. In this case, it is possible to restrict linear expansion, to prevent movement of the optical modulation element, and to maintain a constant temperature and a uniform in-plane temperature distribution of the optical modulation element.

On the other hand, the dust-preventing member may be made of metal. This makes it possible to improve the heat dissipation effect. In particular, when a polarizer is bonded to the transparent plate, it is preferable that the dust-preventing member be made of metal because heat is generated with the absorption of light by the polarizer.

In the optical modulation element of the present invention, it is also possible to bond the polarizer to the transparent plate. This prevents dust from entering between the polarizer and the transparent plate. For this reason, negative effects, such as the light flux emitted from the optical modulation element being scattered by dust, can be prevented more effectively.

In addition, in the optical modulation element of the present invention, at least one surface of the transparent plate may preferably be coated with a surface-active agent, or treated for electrostatic protection. This makes it possible to prevent dust from adhering to the transparent plate.

A projection display device of the present invention may be constructed in which a transparent plate is provided on the side of a light outgoing surface of the optical modulation element, and the space between the transparent plate and the light outgoing surface of the optical modulation element is shielded from the outside by a dust-preventing member.

When the polarizer is arranged on the side of the light outgoing surface of the transparent plate, since the transparent plate and an air layer exist between the optical modulation element and the polarizer, heat generated by a polarizer to be transmitted to the optical modulation element can be further reduced. In addition, since the space between the transparent plate and the optical modulation element is shielded from the outside by the dust-preventing member, dust does not enter the space. For this reason, bad effects, such as the light flux emitted from the optical modulation element being scattered by dust, can be solved.

As the dust-preventing member, a member having a frame body for holding the optical modulation element and the transparent plate, and a light outgoing-side outer frame detachably fixed to the light outgoing side of the frame body may be used. In the case of using such a dust-preventing member, the frame body may be provided with a light incident contact surface which contacts a part of the light incident surface of the optical modulation element, an optical modulation element side contact surface which contacts the side surface of the optical modulation element, and a transparent plate side contact surface which contacts the side surface of the transparent plate. In addition, the light outgoing-side outer frame may be provided with a pressure surface that can press a part of the light outgoing surface of the transparent plate towards the frame body.

This allows the optical modulation element to come into contact with the light incident contact surface and the optical modulation element contact surface provided on the frame body, thereby being arranged in a predetermined position on the frame body. In addition, the position of the transparent plate relative to the frame body and the optical modulation element is defined by the transparent plate contact surface and a spacer provided on the frame body. Therefore, if the light outgoing-side outer frame, is fixed to the frame body after the optical modulation element, spacer and transparent plate have been superposed in this order, the light outgoing surface of the transparent plate is pressed by the pressure surface of the light outgoing-side outer frame towards the frame body side, so that the optical modulation element, spacer and transparent plate can be held by the frame body and the light outgoing-side outer frame, and at the same time, arrangement thereof in relation to one another can be maintained.

If the optical modulation element, the transparent plate and the like are fixed to the frame body using an adhesive, replacement thereof requires much labor. For example, after the optical modulation element and the transparent plate are separated from the frame body, a step of cleaning the adhesive adhering thereto is required.

In contrast, if the dust-preventing member such as described above is used, the light outgoing-side outer frame may merely be removed at the time of replacement of components, so that operability of rework can be improved.

It is desirable that a guide surface for putting a roller on the light outgoing surface of the optical modulation element and moving the roller in one direction is provided on the frame body. An antireflection film (AR film) may be bonded to the light outgoing surface of the optical modulation element for the purpose of improving the light utilizing efficiency. In such a case, if the roller is moved along the guide surface with the AR film placed on the light outgoing surface of the optical modulation element, the AR film can be easily bonded to the light outgoing surface of the optical modulation element.

In addition, since the guide surface is formed and the roller can be easily moved, it is easy to eliminate air bubbles generated between the light outgoing surface of the optical modulation element and the AR film. When replacing the AR film to which dust is adhered, the light outgoing-side outer frame is removed from the frame body and the transparent plate and the spacer are removed from the frame body. Thereafter, the AR film to which dust is adhered is separated from the light outgoing surface of the optical modulation element, and a new AR film is bonded with the use of the guide surface as described above while moving the roller. After the renewal of the AR film, the spacer and the transparent plate are superposed on the optical modulation element and the light outgoing-side outer frame is fixed to the frame body. The AR film can be easily renewed by using the dust-preventing member having the frame body on which the guide surface is formed.

In such a projection display device of the present invention, at least one surface of the transparent plate may be coated with an antireflection film, whereby light reflected from the transparent plate to the optical modulation element can be eliminated as described above, and switching characteristic of the optical modulation element can be maintained more excellently.

As the optical modulation element, either of transmissive or reflective optical modulation element may be used. When the transmissive optical modulation element is used, the transparent plate (light incident-side transparent plate) may desirably be provided not only on the side of the light outgoing surface, but also on the side of the light incident surface thereof and further, the space between the transparent plate provided on the side of the light incident surface and the light incident surface of the optical modulation element may desirably be shielded from the outside by the dust-preventing member.

When the transmissive optical modulation element is used and the transparent plate is provided on the side of the light incident surface thereof, a bonded light outgoing surface contacting a part of the light outgoing surface of the transparent plate on the side of the light incident surface and a transparent side contact surface contacting the side surface of the light incident-side transparent plate may be provided on the frame body of the dust-preventing member. In addition, a light incident-side outer frame detachably fixed to the light incident side of the frame body may be provided, and a pressure surface that can press the light incident surface of the light incident-side transparent plate towards the frame body may be provided on the light incident-side outer frame. This allows the light incident-side transparent plate to be held on the side of the light incident surface of the optical modulation element without using an adhesive. In addition, the transparent plate can be easily replaced by only removing the light incident-side outer frame from the frame body.

When the light incident-side outer frame and the light outgoing-side outer frame are formed of the same shape, engaging pawls extending along the side surface of the frame body are formed on the respective outer frames, and engaging projections each corresponding to the engaging pawls are formed on the frame body, the positions of the respective engaging projections formed on the frame body may desirably be shifted in the direction perpendicular to the thickness direction of the frame body. It is difficult to form a frame body on which the positions of the respective engaging projections match in the thickness direction of the frame body by upper and lower dies. However, the frame body can be easily formed as in a conventional manner by using the frame body as described above. In addition, since the light incident-side outer frame and the light outgoing-side outer frame have the same shape, commonality of components can be achieved.

The dust-preventing member may preferably be formed of resin containing glass fiber. In this case, it is possible to restrict linear expansion, to prevent movement of the optical modulation element, and to maintain a constant temperature and a uniform in-plane temperature distribution of the optical modulation element.

On the other hand, if the dust-preventing member is made of metal, it is possible to improve the heat dissipation effect. In particular, when a polarizer is bonded to the transparent plate, it is preferable that a mounting frame plate be made of metal because heat is generated with the absorption of light by the polarizer.

In the above-described projection display device of the present invention, it is also possible to bond the polarizer to the transparent plate. This prevents dust from entering between the polarizer and the transparent plate. For this reason, negative effects, such as the light flux emitted from the optical modulation element being scattered by dust, can be prevented more effectively.

In addition, in the above-described projection display device of the present invention, at least one surface of the transparent plate may preferably be coated with a surface-active agent, or treated for electrostatic protection. This makes it possible to prevent dust from adhering to the transparent plate.

Furthermore, the projection display device of the present invention adopts a construction such as a projection display device for separating a light flux emitted from a light source into a plurality of color light fluxes, modulating respective color light fluxes according to image information through an optical modulation element, synthesizing respective color light fluxes modulated by the optical modulation element by a color synthesizing means, and enlarging and projecting light synthesized by the color synthesizing means onto a projection surface through projection means, the projection display device including: a transparent plate provided on the side of a light outgoing surface of the optical modulation element, a dust-preventing member for holding the transparent plate and the optical modulation element and for shielding the space between the transparent plate and the light outgoing surface of the optical modulation element from the outside, a fixed frame plate fixed on the light incident surface of the color synthesizing means, and an intermediate frame plate removably fixed to the fixed frame plate, wherein the dust-preventing member is fixed to the intermediate frame plate. By the projection display device having this construction, the heat generated by the polarizer to be transmitted to the optical modulation element can be further reduced, and bad effects such that the light flux emitted from the optical modulation element is scattered by dust can be avoided. In addition to this, since it is not necessary to mount the optical modulation element to the color synthesizing means side by directly touching the optical modulation element, it is also possible to prevent the optical modulation element from interfering with other parts and to prevent it from being broken or chipped.

In the projection display device of the present invention having this construction, it is convenient to provide positioning means for positioning the optical modulation element by defining the mounting position of the dust-preventing member because the mounting positions of the dust-preventing member and the optical modulation element can be defined at the same time by this positioning means.

In the projection display device having this construction, when the transmissive optical modulation element is used, it is desirable to provide the transparent plate not only on the side of the light outgoing surface but also on the side of the light incident surface, as mentioned above. It is also desirable that the space between the transparent plate provided on the light incident surface side and the light incident surface of the optical modulation element is shielded from the outside by the dust-preventing member.

Here, there may be a case where the polarizer is fixed to the light incident surface of the color synthesizing means. In such a case, if the peripheral portion of the polarizer is completely superposed on the bonded surface of the fixed frame plate, there is a fear that the bonding strength decreases or the polarizer is separated. In order to assuredly avoid such a problem, it may be preferable to form the fixed frame plate so that only a part of the bonded surface is superposed on the peripheral portion of the polarizer. That is, it may be preferable that the bonded surface of the fixed frame plate to the light incident surface is not completely covered with the polarizer.

The surface of the transparent plate may be coated with a surface-active agent, or treated for electrostatic protection. In this case, it is difficult for dust to adhere to the surface of the transparent plate, and it is possible to prevent dust from adhering effectively.

When a polarizer is bonded to the transparent plate, since it is possible to prevent dust from entering between the optical modulation element and the polarizer, the polarization condition of light is not disturbed by dust. In addition, when a black image is displayed, a spot on the black image corresponding to the adhering dust can be prevented from being displayed as a white blank, and display quality can be improved.

When the above-described dust-preventing member is formed of resin containing glass fiber, it is possible to restrict linear expansion, to prevent moving of the optical modulation element, and to maintain a constant temperature and a uniform in-plane temperature distribution of the optical modulation element.

On the other hand, if the dust-preventing member is made of metal, it is possible to improve the heat dissipation effect. In particular, when a polarizer is bonded to the transparent plate, it is preferable that the dust-preventing member be made of metal because heat is generated with the absorption of light by the polarizer.

BRIEF DESCRIPTION OF THE DRAWINGS

FIGS. 17(A)–(C) are schematic structural views of an optical system incorporated into an optical unit of a conventional projection display device.

DETAILED DESCRIPTION OF PREFERRED EMBODIMENTS

<Embodiment 1>

An example of a projection display device to which the present invention is applied will be described below with reference to the drawings. The projection display device of this embodiment separates a light flux emitted from a light source lamp unit into light fluxes of three primary colors of red (R), green (G) and blue (B), and these color light fluxes are modulated in correspondence to image information through liquid crystal modulation elements, and modulated light fluxes of respective colors are synthesized and displayed in enlargement onto a screen through a projection lens unit.

Figure 1:
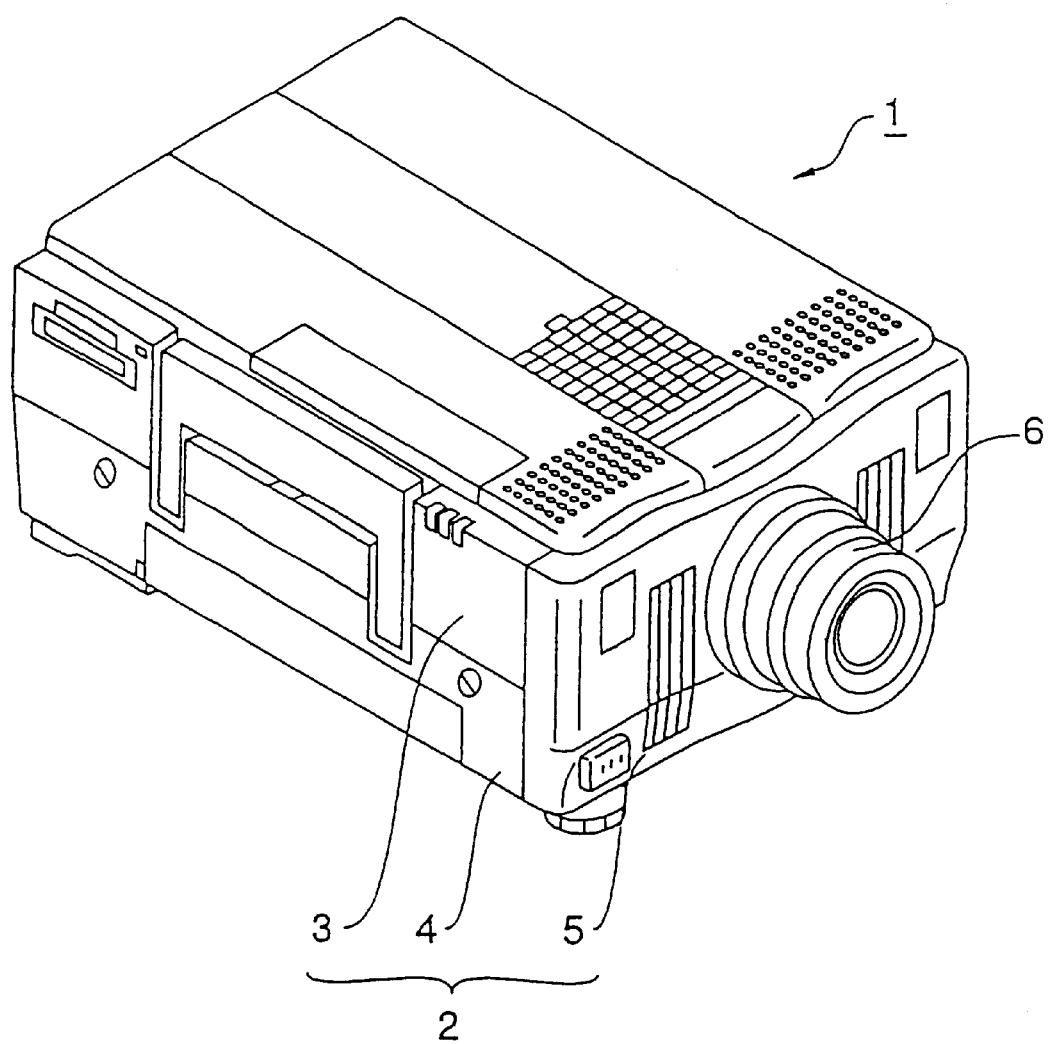
FIG. 1 is a perspective view showing an external shape of a projection display device to which the present invention is applied.

FIG. 1 shows an external appearance of the projection display device of this embodiment. As shown in FIG. 1, a projection display device 1 of this embodiment has an outer casing 2 in the shape of a rectangular parallelepiped. The outer casing 2 basically consists of an upper casing 3, a lower casing 4 and a front casing 5 for defining the front of the device. The leading end of a projection lens unit 6 protrudes from the center of the front casing 5.

Figure 2:
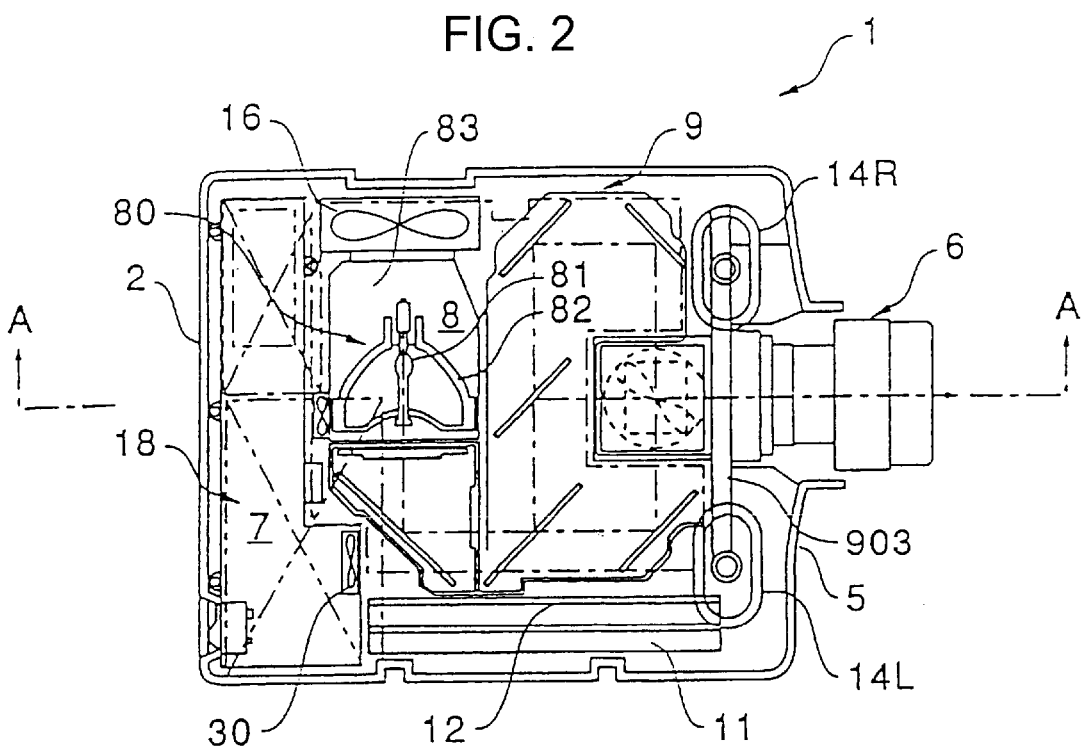
FIG. 2 is a schematic plan structural view showing the internal construction of the projection display device shown in FIG. 1.
Figure 3:
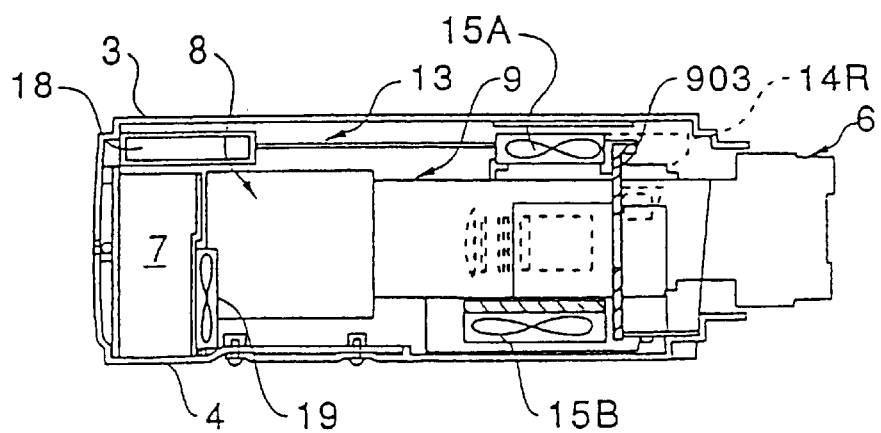
FIG. 3 is a schematic sectional structural view taken along the line A—A of FIG. 2.

FIG. 2 shows the respective arrangement of components inside the outer casing 2 of the projection display device 1, and FIG. 3 shows a cross section taken along the line A—A of FIG. 2. As shown in these drawings, inside the outer casing 2, a power supply unit 7 is arranged on the rear end of the inside of the outer casing 2. A light source lamp unit 8 is arranged at position adjacent to and offset from the power supply unit 7 towards the front side of the device. An optical unit 9 is arranged in front of the light source lamp unit 8. A base end of the projection unit 6 is positioned at the front center of the optical unit 9.

On the other hand, an interface substrate 11 having an input-output interface circuit mounted thereon is arranged on a side of the optical unit 9 so that it extends towards the front and rear directions of the device, and a video substrate 12 having a video signal processing circuit mounted thereon is arranged in parallel to therewith. Furthermore, a control substrate 13 for controlling the drive of the device is arranged above the light source lamp unit 8 and the optical unit 9. Speakers 14R and 14L are arranged at the right and left front corners of the device, respectively.

A suction fan 15A for cooling is arranged on the center upper side of the optical unit 9, and a circulating fan 15B for forming a circulating stream for cooling is arranged on the center bottom side of the optical unit 9. In addition, an exhaust fan 16 is arranged on a side of the device, which is the rear side of the light source lamp unit 8. Furthermore, an auxiliary cooling fan 17 for sucking a cooling air stream from the suction fan 15A into the power supply unit 7 is arranged at a position in the power supply unit 7 opposed to the ends of the substrates 11 and 12.

A floppy-disk drive unit 18 is arranged directly above the power supply unit 7 on the left side of the device.

The light source lamp unit 8 includes a light source lamp 80, and a lamp housing 83 containing therein the light source lamp 80. The light source lamp 80 includes a lamp body 81 such as a halogen lamp, a xenon lamp, or a metal halide lamp, and a reflector 82 including a reflecting surface that is parabolic in cross section, and it can reflect divergent light from the lamp body 81 so that the light emerges towards the optical unit 9 almost along an optical axis.

Figure 4:
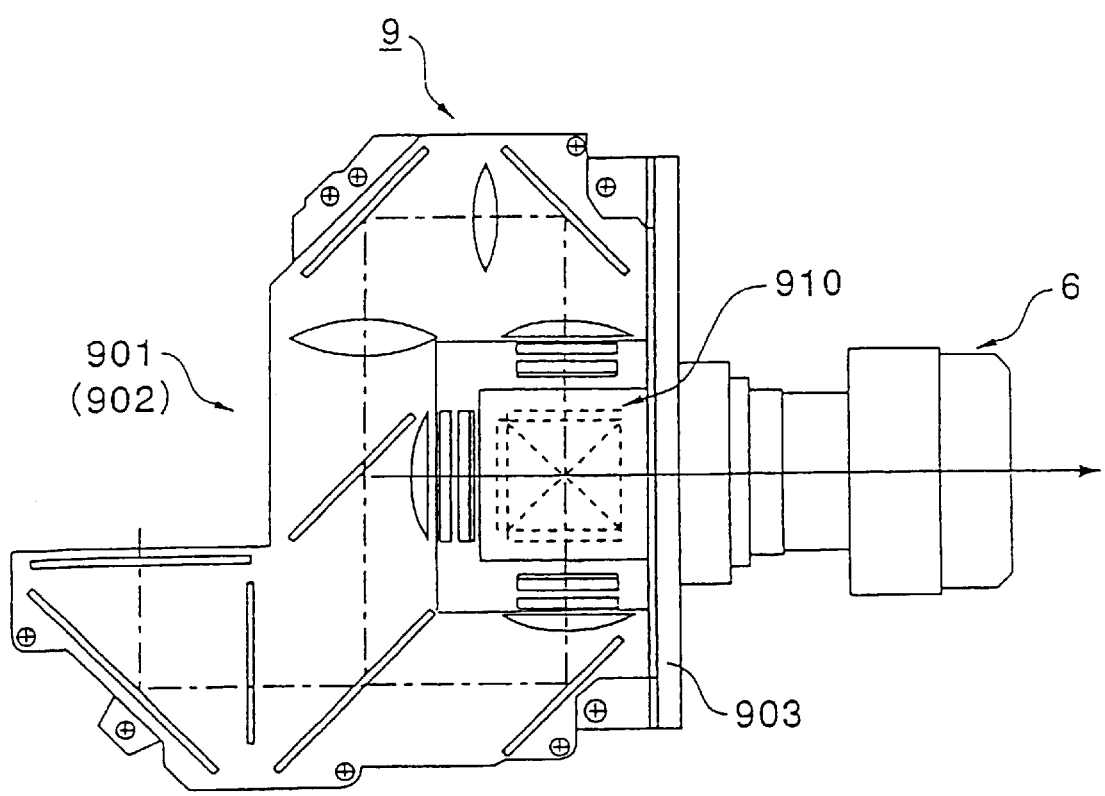
FIG. 4 is a schematic plan structural view showing only an optical unit and a projection lens unit.

FIG. 4 shows only the optical unit 9 and the projection lens unit 6. As shown in this drawing, in the optical unit 9, optical elements other than a color synthesizing prism 910 are vertically sandwiched and held between the upper and lower light guides 901 and 902. The upper light guide 901 and the lower light guide 902 are fixed by fixing screws on the sides of the upper casing 3 and the lower casing 4, respectively.

In addition, these upper and lower light guide plates 901 and 902 are similarly fixed on the sides of the color synthesizing prism 910 by fixing screws. The color synthesizing prism 910 is fixed by fixing screws on the rear of a thick head plate 903 formed of a die-casting plate. The base end of the projection lens unit 6 is similarly fixed on the front of the head plate 903 by fixing screws.

Figure 5:
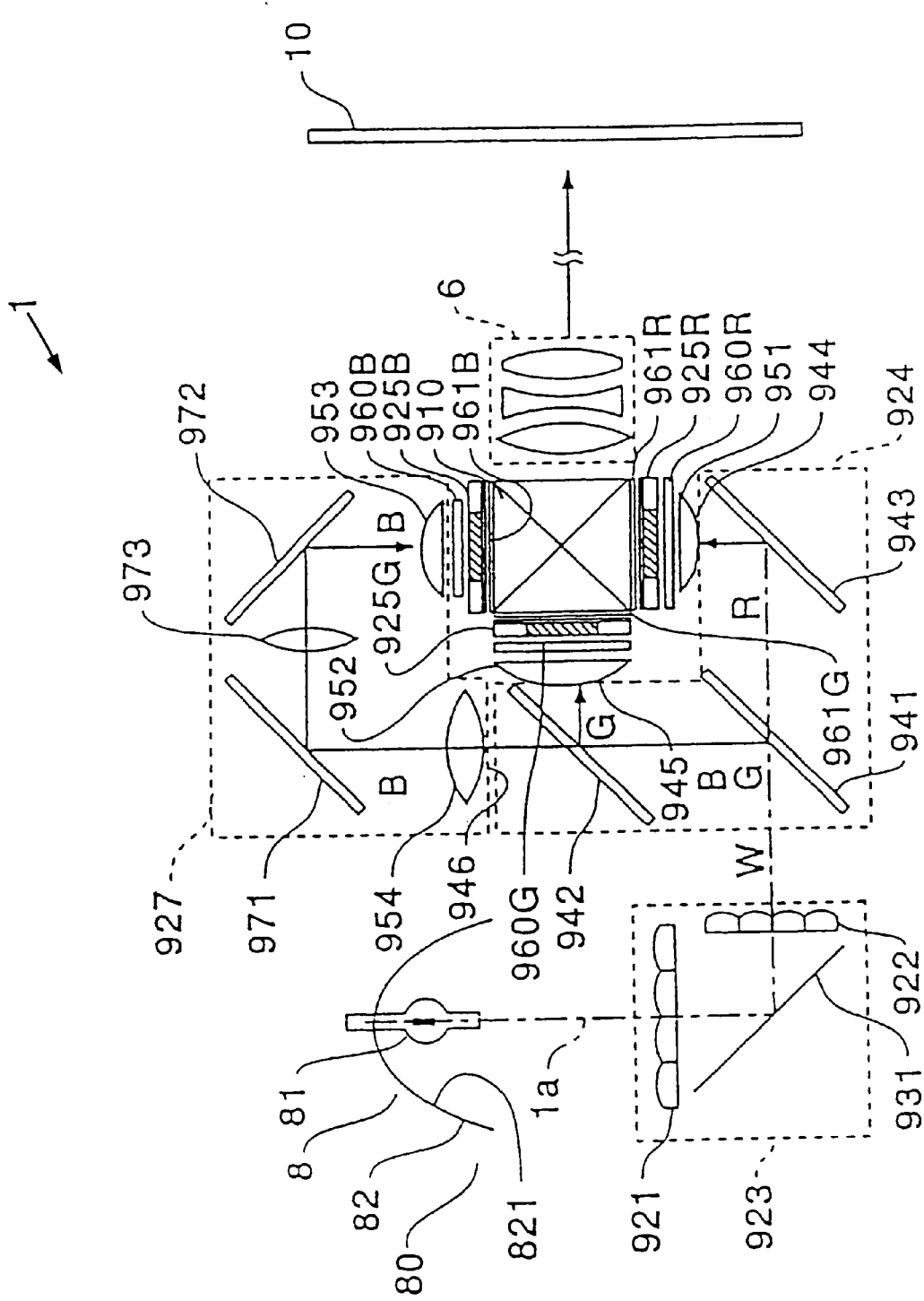
FIG. 5 is a schematic structural view showing an optical system incorporated into the optical unit.

FIG. 5 shows a schematic construction of an optical system incorporated into the projection display device 1 of this embodiment. The optical system in the projection display device 1 of this embodiment adopts a light source lamp 80, which is a component of the light source lamp unit 8, and a uniform illumination optical system 923 consisting of integrator lenses 921 and 922, which are uniform illumination optical elements. The projection display device 1 includes a color separation optical system 924 for separating a light flux W emitted form the uniform illumination optical system 923 into red (R), green (G) and blue (B), three sheets of liquid crystal modulation elements 925R, 925G and 925B for modulating the respective color light fluxes R, G and B, the color synthesizing prism 910 serving as a color synthesizing optical system for synthesizing the modulated color light fluxes, and a light guide system 927 for guiding the synthesized light fluxes to the liquid crystal modulation element 925B corresponding to the blue light flux B in the projection lens unit 6 that enlarges and projects the synthesized color light fluxes onto the surface of the screen 10.

The uniform illumination optical system 923 includes a reflecting mirror 931 so as to bend an optical axis 1a of outgoing light from the uniform illumination optical system 923 at the right angle towards the front of the device. The integrator lenses 921 and 922 are arranged in the state of being perpendicular to each other with this reflecting mirror 931 sandwiched therebetween.

Light emitted from the light source lamp 80 is projected as a secondary source image through the integrator lens 921 onto the incident surface of each of the lenses constituting the integrator lens 922, so that an object to be illuminated is irradiated using the outgoing light from the integrator lens 922.

The color separation optical system 924 consists of a blue-green reflecting dichroic mirror 941, a green reflecting dichroic mirror 942 and a reflecting mirror 943. First, the blue light flux B and the green light flux G contained in the light flux W are reflected at right angles by the blue-green reflecting dichroic mirror 941, and directed towards the green reflecting dichroic mirror 942.

The red light flux R passes through this mirror 941, and is reflected at right angles by the rear reflecting mirror 943 located behind, and emitted from an outgoing section 944 for the red light flux R to the side of the prism unit 910. Next, only green light flux G of the blue and green light fluxes B and G reflected by the mirror 941 is reflected at right angles by the green reflecting dichroic mirror 942, and is emitted from an outgoing section 945 for the green light flux G to the side of the color synthesizing optical system. The blue light flux B passing through this mirror 942 is emitted from an outgoing section 946 for the blue light flux B to a side of the light guide system 927. In this embodiment, all the distances between the outgoing section for the light flux W of the uniform illumination optical element and the outgoing sections 944, 945 and 946 for the color light fluxes of the respective color separation optical system 924 are equally set.

Condenser lenses 951 and 952 are arranged on the outgoing sides of the outgoing sections 944 and 945 of the red and green light fluxes R and G in the color separation optical system 942, respectively. Therefore, the red and green light fluxes R and G emitted from the outgoing sections respectively are incident on these condenser lenses 951 and 952, where they are collimated.

The thus collimated red and green light fluxes R and G are incident on the liquid crystal modulation elements 925R and 925G to be modulated, and given image information corresponding thereto. That is, these light valves are subjected to switching control by non-illustrated driving means according to image information, whereby each color light passing therethrough is modulated. As such driving means, well-known means may be used unchanged.

On the other hand, the blue light flux B is guided to the corresponding liquid crystal modulation element 925B through the light guide system 927, where it is similarly modulated according to the image information. In the light valves of this embodiment, for example, a poly-silicon TFT may be used as a switching element.

The light guide system 927 consists of a condenser lens 954 arranged on the outgoing side of the outgoing section 946 for the blue light flux B, an incident-side reflecting mirror 971, an outgoing-side reflecting mirror 972, an intermediate lens 973 arranged between these reflecting mirrors, and a condenser lens 953 arranged upstream of the liquid crystal modulation element 925B. The blue light flux B of the color light fluxes has the longest optical path lengths, that is, the distances between a light source lamp 80 and each of the liquid crystal panels, and therefore, the amount of light of the blue light flux B to be lost is the largest. However, the light loss can be restricted by interposing the light guide system 927 therebetween.

Next, the respective color light fluxes R, G and B modulated passing through the respective liquid crystal modulation elements 925R, 925G and 925B are incident on the color synthesizing prism 910, where they are synthesized. A color image synthesized by the color synthesizing prism 910 is enlarged and projected through the projection lens unit 6 onto the surface of the screen 10 located at a predetermined position.

Figure 6A:
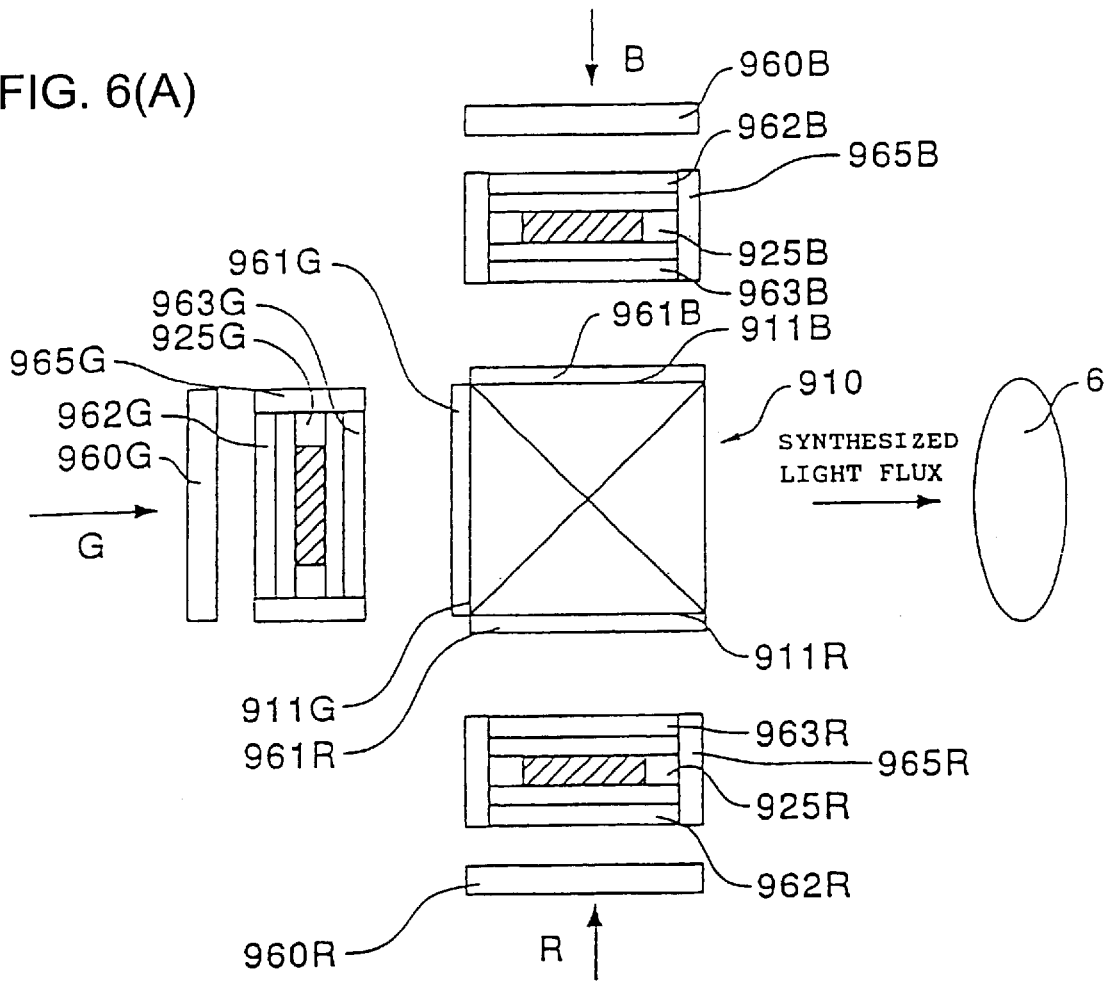
FIGS. 6(A)–(B) are enlarged views of the surroundings of a liquid crystal modulation element of a projection display device according to an embodiment 1 of the present invention.
Figure 6B:
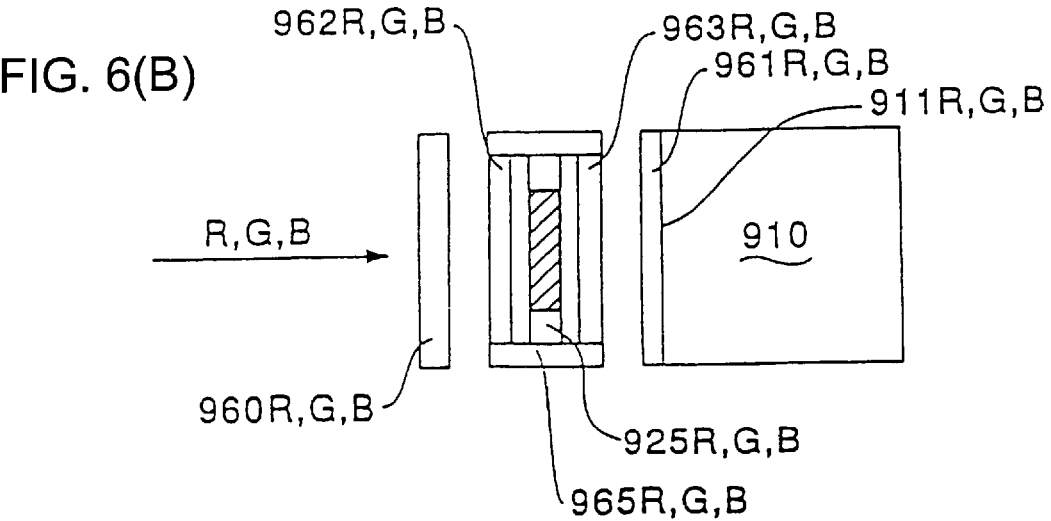

FIG. 6 schematically shows a construction of the surroundings of the liquid crystal modulation elements.

As shown in FIG. 6, in this embodiment, transparent plates 962R, 962G, 962B, 963R, 963G and 963B made of plastic or glass are provided between dust-preventing members 965R, 965G and 965B on the side of the light incident surfaces and on the side of the light outgoing surfaces of the liquid crystal modulation elements 925R, 925G and 925B, respectively, which are plane-opposed to light incident surfaces 911R, 911G and 911B of the color synthesizing prism 910 at a predetermined distance. Spaces between the transparent plates 962R, 962G, 962B, 963R, 963G and 963B and the liquid crystal modulation elements 925R, 925G and 925B are shielded from the outside by the dust-preventing members 965R, 965B and 965B. For this reason, since dust does not enter between the transparent plates 962R, 962G, 962B, 963R, 963G and 963B and the liquid crystal modulation elements 925R, 925G and 925B, the respective color light fluxes can be prevented from being scattered by the dust. In addition, the light outgoing surfaces of the liquid crystal modulation elements 925R, 925G and 925B are coated with light antireflection thin films, thereby preventing the aforementioned malfunction of the liquid crystal modulation elements 925R, 925G and 925B due to the return light described above.

The incident and outgoing surfaces of the transparent plates 963R, 963G and 963B are also coated with light antireflection thin films.

Incident-side polarizers 960R, 960G and 960B are arranged at a predetermined distance from the light incident surfaces of the transparent plates 962R, 962G and 962B, and outgoing-side polarizers 961R, 961G and 961B are bonded to the light incident surfaces 911R, 911G and 911B of the color synthesizing prism 910, respectively.

In the thus constructed projection display device, since the incident-side polarizers 960R, 960G and 960B and the outgoing-side polarizers 961R, 961G and 961B are provided apart from the light incident surfaces and light outgoing surfaces of the liquid crystal modulation elements 925R, 925G and 925B, and the transparent plates 962R, 962G and 962B, 963R, 963G and 963B and air are provided between the incident-side polarizers 960R, 960G and 960B, the outgoing-side polarizers 961R, 961G and 961B and the liquid crystal modulation elements 925R, 925G and 925B, it is possible to prevent heat generated by the incident-side polarizers 960R, 960G and 960B and the outgoing-side polarizers 961R, 961G and 961B from being transmitted to the liquid crystal modulation elements 925R, 925G and 925B. In addition, since the light outgoing surfaces of the liquid crystal modulation elements 925R, 925G and 925B are protected by the transparent plates 963R, 963G and 963B, and the transparent plates 963R, 963G and 963B are apart from the light outgoing surfaces of the liquid crystal modulation elements 925R, 925G and 925B, it is possible to prevent heat generated by the outgoing-side polarizers 961R, 961G and 961B from being transmitted to the liquid crystal modulation elements 925R, 925G and 925B. This makes it possible to restrict the increase in temperature of the liquid crystal modulation elements 925R, 925G and 925B and to prevent the deterioration of optical properties thereof.

In addition, since the liquid crystal modulation elements 925R, 925G and 925B and the outgoing-side polarizers 961R, 961G and 961B are apart from each other, the light emitted from the liquid crystal modulation elements 925R, 925G and 925B is widely spread, and the light can be received by a wide area. For this reason, it is possible to decrease the heat generated by the polarizers 961R, 961G and 961B per unit area, and to permit easy heat dissipation. In particular, it is effective to arrange a michrolens array, which gathers light onto each pixel of the liquid crystal modulation elements, on the side of the light incident surfaces of the liquid crystal modulation elements 925R, 925G and 925B because the light can spread more widely.

Furthermore, in the projection display device of this embodiment, since the transparent plates 962R, 962G and 962B are bonded to the side of the light incident surfaces of the liquid crystal modulation elements 925R, 925G and 925B, it is possible to prevent dust from adhering to the light incident surfaces of the liquid crystal modulation elements 925R, 925G and 925B.

Incidentally, the outgoing-side polarizers 961R, 961G and 961B may surely be bonded to the transparent plates 963R, 963G and 963B without being bonded to the light incident surfaces 911R, 911G and 911B of the color synthesizing prism 910. In this case, it is possible to prevent dust from entering between the liquid crystal modulation elements 925R, 925G and 925B and the polarizers 961R, 961G and 961B, and to thereby prevent the polarization condition of light from being disturbed by dust. In addition, when a black image is displayed, its portion corresponding to the adhering dust can be prevented from being displayed as a white blank, and the display quality can be improved.

In addition, the outgoing-side polarizers 961R, 961G and 961B may surely be independently arranged between the transparent plates 962R, 962G, 962B and the color synthesizing prism 910.

Further, the surfaces of such transparent plates 962R, 962G, 962B, 963R, 963G and 963B may be coated with a surface-active agent (surfactant), or treated for electrostatic protection. This makes it difficult for dust to adhere to the surfaces of the transparent plates 962R, 962G, 962B, 963R, 963G and 963B, so that adhesion of the dust can be prevented more effectively.

Incidentally, the polarizers include two types of polarizers, a reflective polarizer and an absorptive polarizer. The reflective polarizer transmits one of two types of linearly polarized light, and reflects the other linearly polarized light. In addition, the absorptive polarizer transmits one of two types of linearly polarized light and absorbs the other linearly polarized light. The polarizers 960R, 960G, 960B, 961R, 961G and 961B may be either reflective or absorptive.

Figure 7:
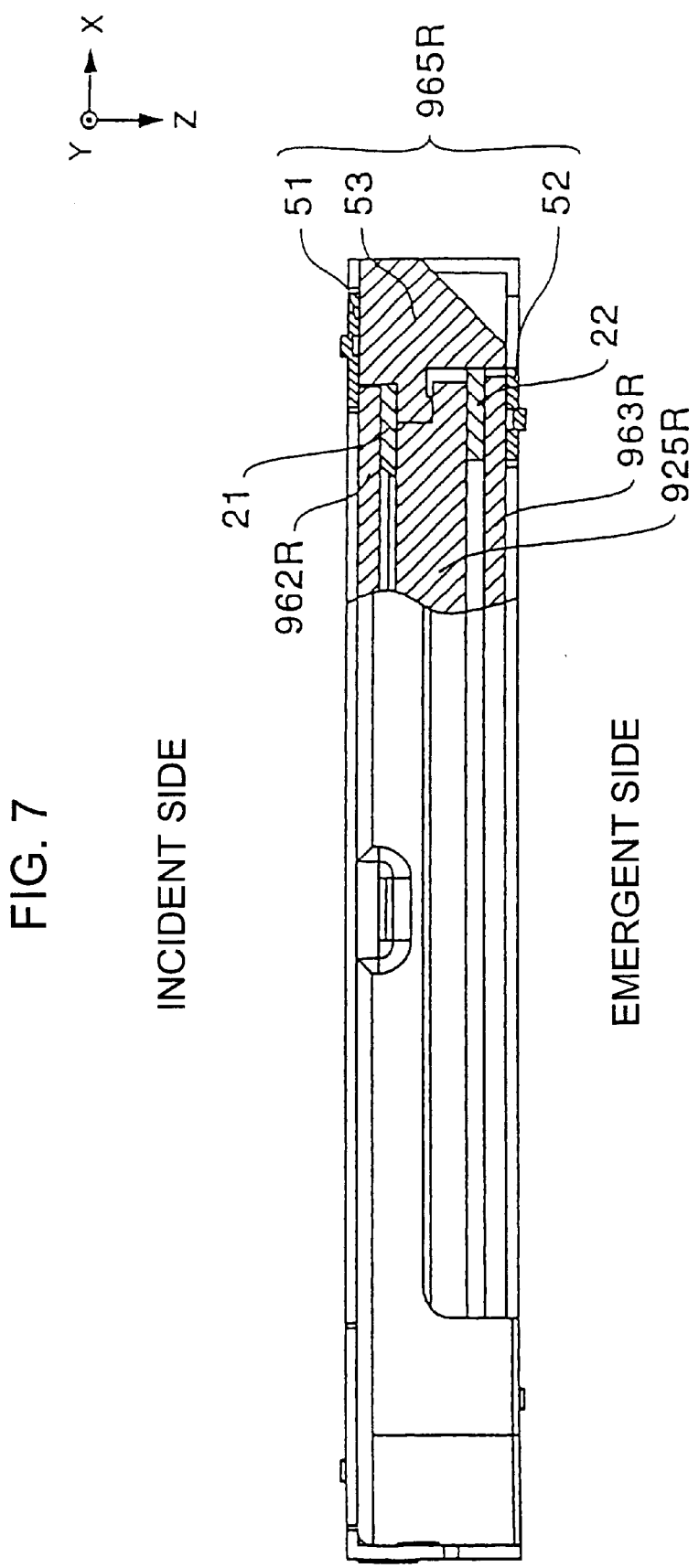
FIG. 7 is a schematic sectional structural view of a dust-preventing member.
Figure 8:
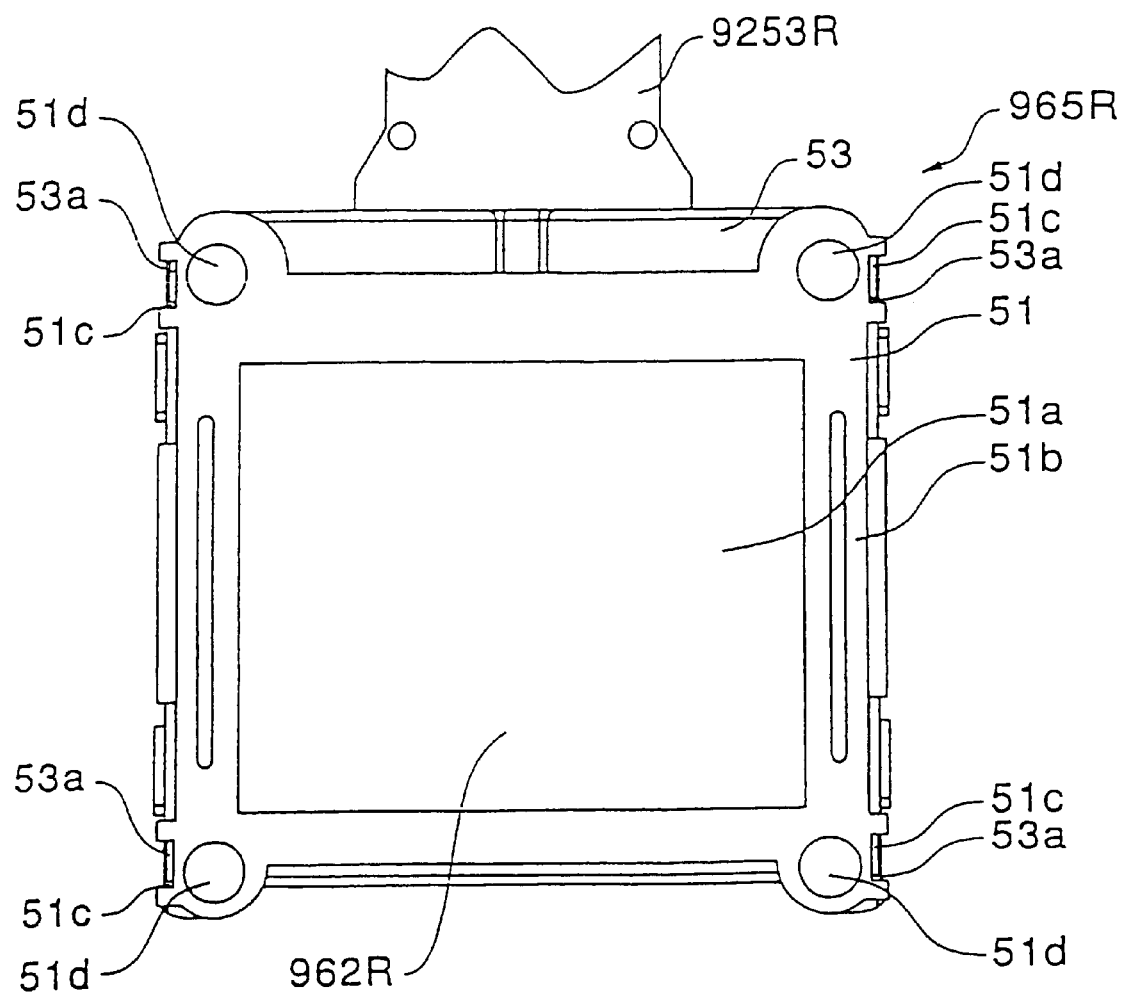
FIG. 8 is a schematic plan structural view of the dust-preventing member when viewed from the light incident side.
Figure 9:
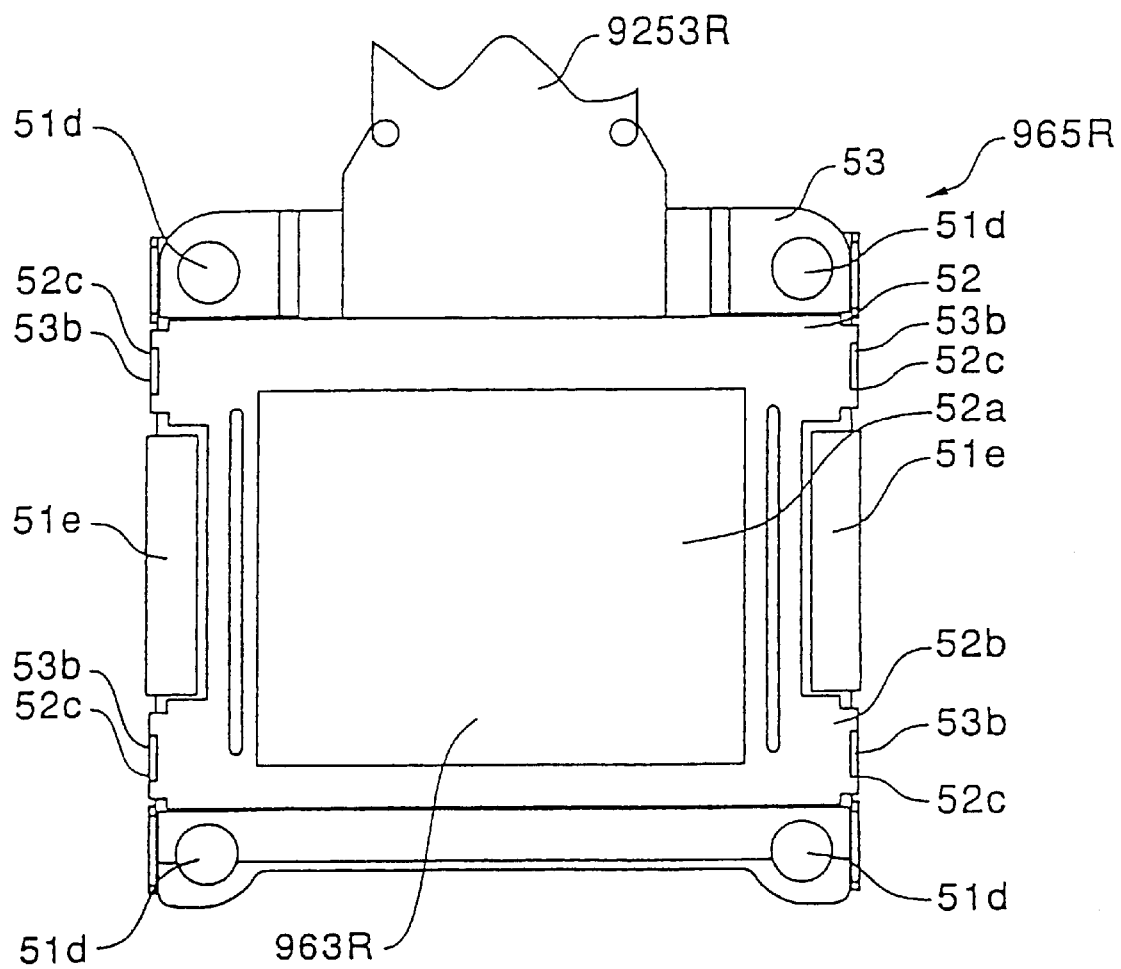
FIG. 9 is a schematic plan structural view of the dust-preventing member when viewed from the light outgoing side.

The structure of the dust-preventing members 965R, 965G and 965B will now be described in detail. Incidentally, since the respective dust-preventing members 965R, 965G and 965B have the same construction, only the dust-preventing member 965R will be described on behalf thereof. In addition, in the following explanation, three directions perpendicular to one another are referred to as the X-axis direction (lateral direction), the Y-axis direction (vertical direction) and the Z-axis direction (direction parallel to the optical axis) for convenience. FIG. 7 shows a schematic sectional construction of the dust-preventing member 965R. In addition, FIG. 8 shows a schematic plan construction of the dust-preventing member 965R when viewed from the side of the light incident surface, and FIG. 9 shows a schematic plan construction when viewed from the side of the light outgoing surface.

As shown in these drawings, the transparent plate 962R is arranged on the light incident surface of the liquid crystal modulation element 925R through a spacer 21, and the transparent plate 963R is arranged on the light outgoing surface through a spacer 22. In this embodiment, the liquid crystal modulation element 925R, and transparent plates 962R and 963R are maintained in such an arrangement by the dust-preventing member 965R.

The dust-preventing member 965R includes first and second outer frames 51 and 52 for clamping the liquid crystal modulation element 925R and transparent plates 962R and 963R, and an intermediate frame 53 for shielding the space between the light outgoing surface of the liquid crystal modulation element 925R and the transparent plate 963R, and the space between the light incident surface of the liquid crystal modulation element 925R and the transparent plate 962R from the outside. The liquid crystal modulation element 925R, transparent plates 962R and 963R are held between the first and second outer frames 51 and 52.

The first outer frame 51 includes a rectangular opening 51$a$ for light transmission, and a peripheral wall 51$b$ having a uniform thickness on the periphery thereof. The second outer frame 52 also includes a rectangular opening 52$a$ for light transmission, and a peripheral wall 52$b$ having a uniform thickness on the periphery thereof. The vertical (vertical direction Y) length of the second outer frame 52 is set longer than the transparent plate 963R, and shorter than the first outer frame 51.

The intermediate frame 53 is a rectangular frame, and is provided to surround the outer periphery of the liquid crystal modulation element 925R, and transparent plates 962R and 963R. Engaging projections 53$a$ are formed at respective left and right positions on the side surface of this intermediate frame 53. In contrast, the engaging holes 51$c$ capable of fitting therein these engaging projections 53$a$ are formed on the side surface of the first outer frame 51 at positions corresponding to the engaging projections 53$a$.

Engage projections 53$b$ are also formed at respective left and right positions on the side surface of this intermediate frame 53. In contrast, the engaging holes 52$c$ capable of fitting in these engaging projections 53b are formed on the side surface of the second outer frame 52 at positions corresponding to the engaging projections 53b.

Therefore, if the first outer frame 51 is pressed into the intermediate frame 53 so that each of the engaging projections 53a are inserted into respective engaging holes 51c from the outside of the transparent plate 962R provided on the side of the light incident surface of the liquid crystal modulation element 925R, and if the second outer frame 52 is pressed into the intermediate frame 53 so that each of the engaging projections 53b are inserted into each of the engaging holes 52c from the outside of the transparent plate 963R provided on the side of the light outgoing surface of the liquid crystal modulation element 925R, the liquid crystal modulation element 925R, the transparent plates 962R and 963R are held by the dust-preventing member 965R.

In addition, the space between the light incident surface of the liquid crystal modulation element 925R and the transparent plate 962R, and the space between the light outgoing surface of the liquid crystal modulation element 925R and the transparent plate 963R are shielded from the outside. Incidentally, a flexible cable 9253R for wiring extends upward from the dust-preventing member 965R.

In this case, if the dust-preventing member 965R is made of resin containing glass fiber, such as FRP, it is possible to restrict linear expansion, to prevent the shift of the dust-preventing member 965R, and to maintain a constant temperature and a uniform in-plane temperature of the dust-preventing member 965R.

On the other hand, if the dust-preventing member is made of metal, it is possible to improve the heat dissipation effect. In particular, when light-absorptive polarizer is bonded to the transparent plate, the heat caused by light being absorbed by the polarizer can be efficiently radiated.

Figure 10:
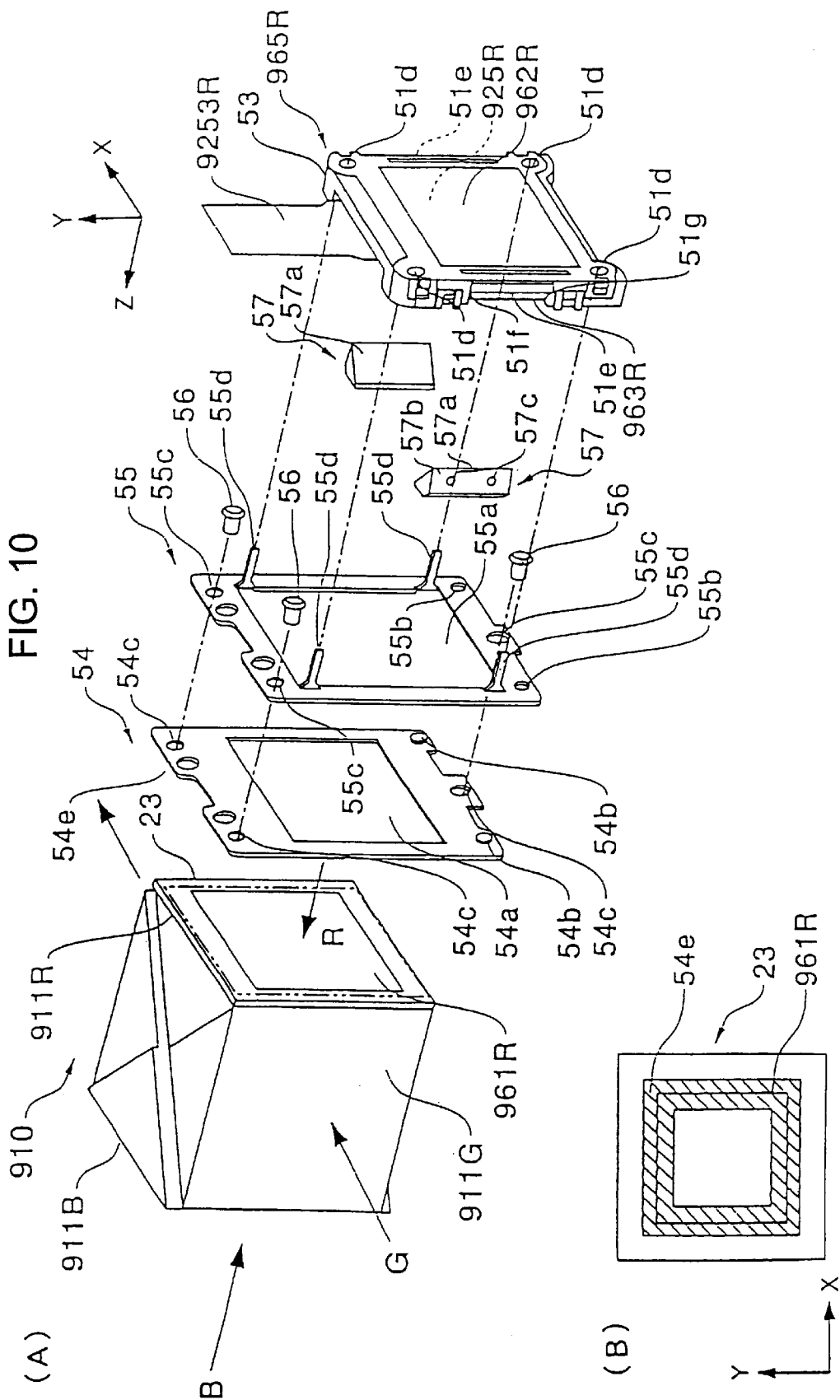
FIG. 10(A) is an exploded perspective view showing a state in which the dust-preventing member is attached to a light incident surface of a color synthesizing prism.
FIG. 10(B) is an illustration showing a large and small relationship between a fixed frame plate and a polarizer.

FIG. 10(A) illustrates a state in which the dust-preventing member 965R holding the liquid crystal modulation element 925R, and the transparent plates 962R and 963R is attached to the light incident surface 911R of the color synthesizing prism 910. An attachment structure for attaching the dust-preventing member 965R to the light incident surface 911R of the color synthesizing prism 910 will be described with reference to this drawing.

As shown in FIG. 10(A), the dust-preventing member 965R holding the liquid crystal modulation element 925R and the like is fixed to a fixed frame plate 54 to be fixedly bonded to the light incident surface 911R of the color synthesizing prism 910. Incidentally, a red filter 23 is bonded to the light incident surface 911R of the color synthesizing prism 910 of this embodiment, and the polarizer 961R is fixed to the surface of the red filter 23.

An intermediate frame plate 55 is a rectangular frame that is formed in almost the same or a larger size of the first outer frame 51 of the dust-preventing member 965R, and includes a rectangular opening 55 a for light transmission. The intermediate frame plate 55 has engaging projections 55d that extend perpendicularly from the surface of the frame plate at the four corners of the rectangular opening 55a thereof. In contrast, the dust-preventing member 965R has engaging holes 51d formed at positions corresponding to the engaging projections 55d, into which the engaging projections 55d can be inserted.

In this embodiment, the engaging holes 51d are formed by through holes that are formed in the first outer frame 51 and the intermediate frame 53 of the dust-preventing member 965R. Therefore, when the respective engaging holes of the dust-preventing member 965R and the respective engaging projections of the intermediate frame plate 55 are aligned and overlaid one on another, the respective engaging projections 55d are inserted in the respective engaging holes 51d, whereby a temporarily attached state is formed.

On the other hand, the fixed frame plate 54 is also a rectangular frame plate having a rectangular opening 54a for light transmission. In addition, the rectangular opening 54 a formed in the fixed frame plate 54 is formed smaller than the light incident surface of the polarizer 961R. The fixed frame plate 54 is fixed to the red filter 23 provided on the light incident surface 911R of the color synthesizing prism 910 with an adhesive.

At this time, if the bonded surface 54e of the fixed frame plate 54 is completely covered with the polarizer 961R, there is a fear that the bonding strength decreases and the polarizer 961R is separated. In this embodiment, however, as shown in FIG. 10(B), since the bonded surface 54e of the fixed frame plate 54 is not completely covered with the polarizer 961R, there is an extremely little possibility of a decrease in bonding strength and separation of the polarizer 961R.

Returning to FIG. 10(A), the fixed frame plate 54 has screw holes 54c at both ends of its upper frame section and at the widthwise center of its lower frame section. The intermediate frame plate 55 also has screw holes 55c corresponding to the three screw holes 54c. By inserting flat-head screws 56 for fastening into the corresponding screw holes 54c and 55c, the intermediate frame plate 55 is fixed to the fixed frame plate 54. Incidentally, in this embodiment, the intermediate frame plate 55 is fixed to the fixed frame plate 54 by the three screws 56. The number of screws is not limited and may be four or more, and two or less. In general, as the number of screws decreases, the number of steps of fastening the screws decreases, and manufacturing is facilitated.

Here, the fixed frame plate 54 has engaging projections 54b at the right and left corners of its lower frame section, and the intermediate frame plate 55 has engaging holes 55b at the right and left corners of its lower frame section corresponding to the two engaging projections 54b. Therefore, when being fixed with the screws 56, the intermediate frame plate 55 can be temporarily fixed to the fixed frame plate 54 by pressing the intermediate frame plate 55 towards the fixed frame plate 54 while aligning the engaging holes 55b of the intermediate frame plate 55 with the engaging projections 54b of the fixed frame plate 54. This makes it possible to further improve the positioning accuracy of both the frame plates.

The projection display device of this embodiment includes positioning means for positioning the dust-preventing member 965R to the intermediate frame plate 55 that is fixed to the fixed frame plate 54. This positioning means includes two wedges 57. Wedge guide surfaces 51e to 51g, against which inclined surfaces 57 a of the wedges 57 abut, are formed on the vertical centers of the right and left side surfaces of the dust-preventing member 965R. When the dust-preventing member 965R is temporarily attached to the intermediate frame plate 55, wedge insertion grooves are formed between the wedge guide surfaces 51e and the frame sections of the intermediate frame plate 55 facing the wedge guide surfaces 51e.

Therefore, after the dust-preventing member 965R has been temporarily attached to the intermediate frame plate 55, the two wedges 57 are struck in the right and left sides of the dust-preventing member 965R, and the amount of the wedges 57 to be pressed in is adjusted, whereby the position of the dust-preventing member 965R is defined, and the liquid crystal modulation element 925R held by the dust-preventing member 965R can be positioned.

A description will now be given of a procedure of attaching the dust-preventing member 965R to the light incident surface 911R of the color synthesizing prism 910. First, the dust-preventing member 965R by which the liquid crystal modulation element 925R and the transparent plates 962R and 963R are held is prepared. In addition, the color synthesizing prism 910 having the light incident surface 911R to which the polarizer 961R is fixed through the red filter 23 is prepared. Next, the fixed frame plate 54 is positioned and fixedly bonded to the red filter 23 that is fixed to the light incident surface 911R of the color synthesizing prism 910. An ultraviolet-curing adhesive or the like may be used as an adhesive.

Then, the intermediate frame plate 55 is positioned on the surface of the fixed frame plate 54 that is fixedly bonded, and the intermediate frame plate 55 is fastened by the three flat-head screws 56. Thereafter, the dust-preventing member 965R by which the liquid crystal modulation element 925R and the like are held is positioned on the intermediate frame plate 55, and is temporarily attached thereto. That is, the engaging projection 55d of the intermediate frame plate 55 is aligned with the engaging hole 51d of the dust-preventing member 965R, and the dust-preventing member 965R is pressed towards the intermediate frame plate 55 in this state. Incidentally, if the fixed frame plate 54 and the intermediate frame plate 55 are combined in advance by screws 56 before fixedly bonding the fixed frame plate 54 to the color synthesizing prism 910, the accuracy of position can be easily obtained.

Thereafter, the liquid crystal modulation element 925R is positioned onto the light incident surface 911R of the color synthesizing prism 910 using the wedges 57 as the positioning means. That is, the two wedges 57 are inserted between the dust-preventing member 965R and the intermediate frame plate 55 that are temporarily attached, along the wedge guide surface 51e formed on the dust-preventing member 965R. Then, the alignment and focusing of the liquid crystal modulation element 925R are adjusted by controlling the amount of insertion of the wedges 57. When the positioning is completed, these wedges 57 are fixedly bonded with an adhesive to the dust-preventing member 965R and the intermediate frame plate 55 that are the members to be positioned. As the adhesive used in this case, an ultraviolet-curing adhesive can also be used.

The positioning operation and the fixedly bonding operation of the above wedges 57 will now be described in more detail following the sequence of steps.

First, a focal surface of the liquid crystal modulation element 925R is adjusted into a focal surface of the projection lens unit 6 using a specific adjustment device. In this state, as mentioned above, the ultraviolet-curing adhesive is filled into the gap formed when the engaging projection 55d of the intermediate frame plate 55 is inserted into the engaging hole 51d of the dust-preventing member 965R, and cured by radiation of ultraviolet-ray to effect temporarily fixing.

Then, by the intermediate frame plate 55 and the wedge guide surfaces 51e provided on the dust-preventing member 965R, the ultraviolet-curing adhesive is irradiated with ultraviolet-ray from the exposed end surfaces of the wedges 57 to effect bonding and actual fixing. Similarly, focusing and pixel-matching between the liquid crystal modulation elements 925R and 925B are adjusted with reference to the liquid crystal modulation element 925G that is arranged in the center of the liquid crystal modulation elements 925R, 925G and 925B so as to effect the temporarily fixing and the actual fixing.

Incidentally, since the temporarily fixing is effected by a setting adjustment device with the color synthesizing prism 910 and the projection lens 6 attached to the head plate 903, it is possible to adjust optimally in accordance with characteristics of individual components. In addition, the dust-preventing member 965R is chucked in the adjustment device with reference to the external shape of the first outer frame 51.

Since the attachment structure of the dust-preventing members 965G and 965B holding the liquid crystal modulation elements 925G and 925B other than the liquid crystal modulation element 925R to the color synthesizing prism 910 is the same as that of the dust-preventing member 965R, a description thereof will be omitted.

When the dust-preventing member 965R is attached to the color synthesizing prism 910 as described above, the following effects can be obtained.

Firstly, since the peripheral portion of the liquid crystal modulation element 925R is protected by the dust-preventing member 965R, it is not necessary to directly touch the liquid crystal modulation element 925R so as to attach it to the color synthesizing prism 910. Therefore, it is possible to prevent the liquid crystal modulation element 925R from abutting against other portions and to prevent it from being broken or chipped. In addition, since the surroundings of the liquid crystal modulation element 925R are covered with the dust-preventing member 965R, it is possible to cut off external light, and to prevent the malfunction of the liquid crystal modulation 925R due to the external light.

Secondly, the dust-preventing member 965R holding the liquid crystal modulation element 925R is detachably fastened by screws to the light incident surface 911R of the color synthesizing prism 910 through the intermediate frame plate 55. Therefore, for example, when the liquid crystal modulation element 925R becomes defective, it can be replaced by a simple operation of removing the screws 56. In addition, since the liquid crystal modulation element 925R is not directly fixedly bonded to the color synthesizing prism 910, the color synthesizing prism 910 is not damaged at the time of the replacement, and expensive components can be used most efficiently.

Thirdly, the dust-preventing member 965R holding the liquid crystal modulation element 925R can be temporarily attached to the intermediate frame plate 55. After forming this temporarily attached state, the liquid crystal modulation element 925R and the light incident surface 911R of the color synthesizing prism 910 can be positioned using the wedges 57. Since the temporarily attached state can be formed as described above, the positioning operation using the wedges 57 can be easily performed in a separate step, thus contributing to an improvement of the cycling time of the equipment.

In general, the wedges 57 made of glass can be used. However, when the dust-preventing member 965R is formed of resin, since it has a high thermal expansion coefficient as compared with glass, the wedges 57 may tend to be separated from the frame plate due to the difference in thermal expansion, and may be broken by a change in temperature. In order to avoid these matters, it is desirable that the wedges 57 be formed of resin of the acrylic group or the like. In addition, the wedges 57 can be molded by being formed of an acrylic material, so that the cost thereof can be substantially reduced as compared with a glass material. Incidentally, by using materials that transmit ultraviolet-ray as the material of the wedges 57, a ultraviolet-curing adhesive of little increase in temperature and of short curing time can be used as the adhesive for fixedly bonding the wedges 57.

In addition, the wedge guide surfaces 51e are formed on the dust-preventing member 965R, whereby the upper end surfaces 51f and 51g are formed on upper and lower portions thereof, and the wedges 57 are guided by these three surfaces. That is, when the adhesive is filled into the portions and the wedges 57 are inserted thereinto, the wedges 57 are automatically moved to the inside while being guided by these three surfaces due to the surface tension of the adhesive. Therefore, the wedges 57 become resistant to disturbance encountered in steps, and can be easily attached.

While the adhesive is used when the dust-preventing member 965R is temporarily fixed to the intermediate frame plate 55, soldering or the like may be used instead of the adhesive. When the dust-preventing member 965R and the like are made of resin, a substance having a metallic member bonded to the joint thereof, or a substance having a metalized layer formed on the joint thereof may be used.

The above-described dust-preventing member 965R, intermediate frame plate 55 and fixed frame plate 54 can be formed of thermosetting resin into which glass fiber or calcium carbonate is mixed. When such a resin material is used, the thermal expansion coefficient thereof becomes close to that of glass as compared with a common resin material. For this reason, pixel displacements and the like due to thermal deformation can be avoided in the state where they are bonded to the color synthesizing prism 910.

While the ultraviolet-curing adhesive can be used as the adhesive for fixedly bonding the fixed frame plate 54 to the color synthesizing prism 910 as described above, it may be desirably coated with a base-processing material in order to increase bonding properties. That is, in the color synthesizing prism 910, the incident surface 911R of the red light flux faces the incident surface 911B of the blue light flux as described above. Since the blue light flux has a short wavelength, a part thereof may be transmitted through a reflecting film of the color synthesizing prism 910 to reach the opposite incident surface 911R of the red light flux. If such backlight is incident on the liquid crystal modulation element 925R, a malfunction may be caused. In this embodiment, since the red filter 23 is provided on the incident surface 911R of the red light flux, it is possible to cut off such a backlight, and to thereby prevent the malfunction of the liquid crystal modulation element 925R due to the backlight.

The filter is attached only to the incident surface 911R of the red light flux because of the largest influence of the backlight of the blue light flux. This, however, does not apply to a case in which the influence of the backlight of other light fluxes is large. The filter may be provided on another surface, or filters may be provided on a plurality of surfaces.

However, the presence of such a filter blocks ultraviolet rays at the time of fixedly bonding, whereby a portion lacking in ultraviolet-ray radiation is generated in the ultraviolet-curing adhesive for fixedly bonding the fixed frame plate 54 to the incident surfaces 911R, 911G and 911B of the color synthesizing prism 910. In order to avoid the negative effects so as to assuredly fixedly bond the fixed frame plate 54 to the incident surface 911R, it is desirable that these bonded surfaces are coated with the base-processing material and that an anaerobic type adhesive is used together with the ultraviolet-curing adhesive. Of course, the incident surface having no such filter may be treated for a similar process.

While the use of the ultraviolet-curing adhesive is described above, other adhesives may be used. For example, when a hot-melt type adhesive is used to fixedly bond the fixed frame plate 54 and the wedges 57, there is no need to consider the above problem arising from the filter.

In addition, in this embodiment, the fixed frame plate 54 and the intermediate frame plate 55 are flat. As described with reference to FIG. 3, the fan 15B is arranged below the color synthesizing prism 910, and cooling air flows from bottom to top. In order to prevent this flow from being disturbed, it is desirable to arrange straightening vanes above the fan 15B. Since the fixed frame plate 54 and the intermediate frame plate 55 are flat, the straightening vanes can be mounted at a position directly below the liquid crystal modulation element 925R and hence, cooling air can flow effectively from bottom to top. Further, since these frame plates have a simple shape, parts can be easily utilized, and the accuracy of the parts is thereby improved.

In addition to this, the two wedges 57 are used for positioning, and they are fixedly bonded to the vertical centers of the right and left sides of the dust-preventing member 965R and the intermediate frame plate 55. If the wedges 57 are fixedly bonded at inadequate positions, there is a fear that excessive stress concentration is caused in the components by thermal deformation of the dust-preventing member 965R, the intermediate frame plate 55, or the wedges 57. In addition, this may cause the wedges 57 to separate from the dust-preventing member 965R or the intermediate frame plate 55.

As described above, however, since the wedges 57 are fixedly bonded to the centers of the right and left sides, the dust-preventing member 965R and the intermediate frame plate 55 are free to thermally deform in the vertical direction, centered on the wedges 57. Therefore, the degree to which the thermal deformation of these frame plates is restrained is low, so that negative effects, such as undesired stress concentration and separation of wedges, can be avoided.

Further, as apparent from FIG. 10(A), each of the wedges 57 in this embodiment has two blind holes 57c formed on its rear surface 57b. These blind holes 57c, in chucking the wedges 57 with a jig, function as engaging portions for chucking. The formation of such blind holes 57c permits easy chucking and therefore, handling thereof becomes easy.

In this embodiment, the blind holes 57c for engagement in chucking are formed on the rear side of the wedges 57. The engaging portions for chucking may be formed on other members. For example, engaging portions for chucking, such as blind holes, may be formed on the outer surface of the dust-preventing member 965R.

Figure 11:
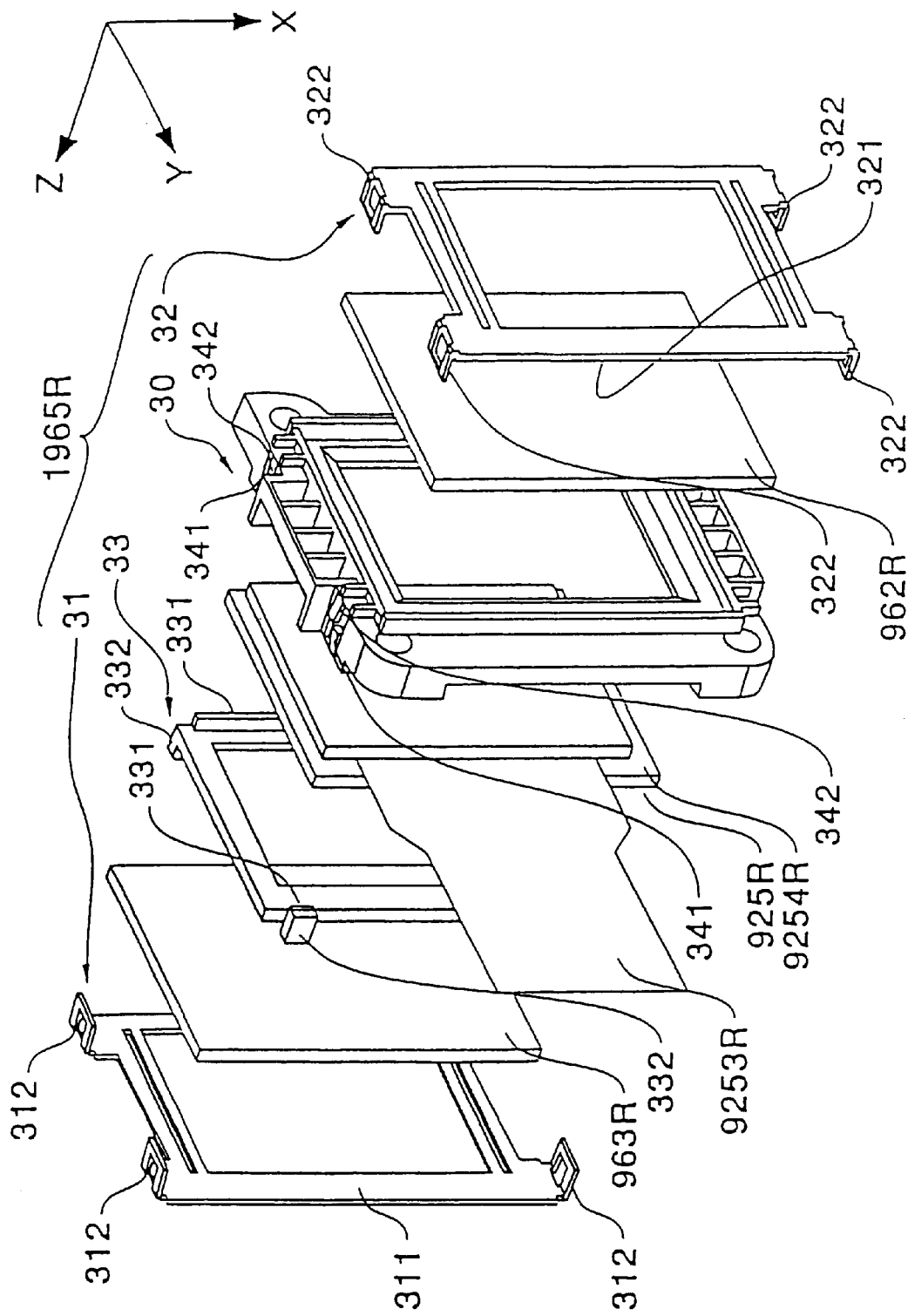
FIG. 11 is an exploded perspective view of an example of a dust-preventing member different from the dust-preventing member shown in FIG. 7.
Figure 12A:
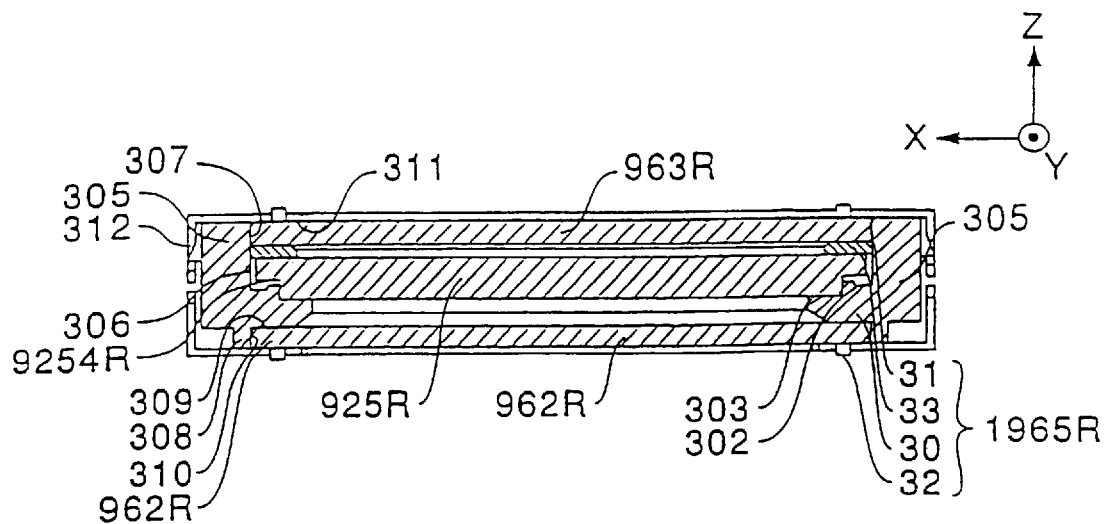
FIG. 12(A) is a schematic sectional structural view of the dust-preventing member shown in FIG. 11 when cut along an XZ plane.
Figure 12B:
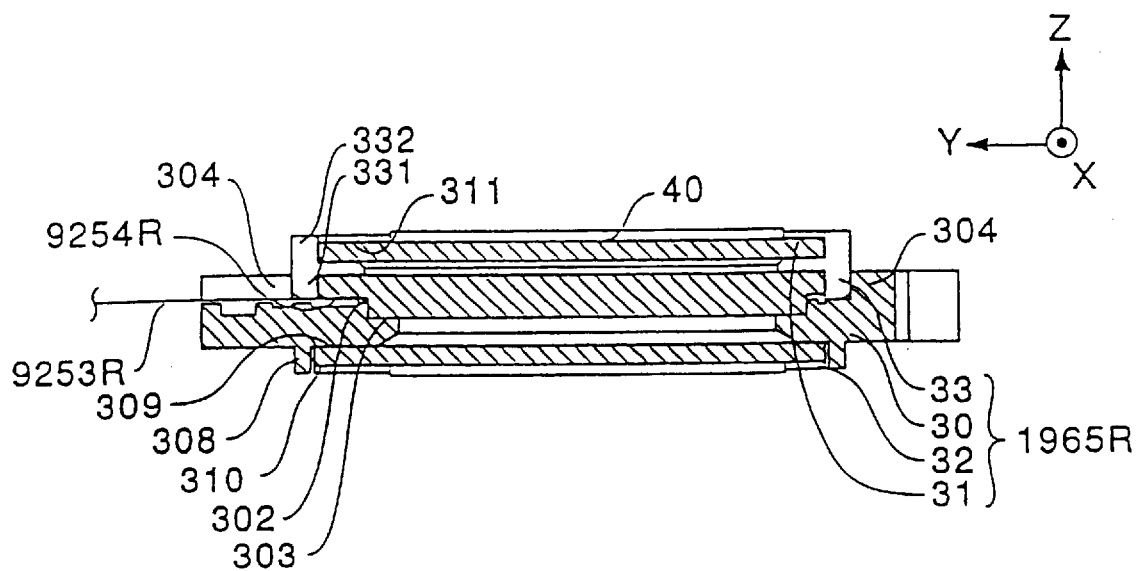
FIG. 12(B) is a schematic sectional structural view of the dust-preventing member shown in FIG. 11 when cut by a YZ plane.

A modification of the dust-preventing member 965R will now be described. FIG. 11 is an exploded perspective view of a modification of the dust-preventing member 965R. FIG. 12(A) is a schematic sectional structural view of a dust-preventing member 1965R when cut along an XZ plane, and FIG. 12(B) is a schematic sectional structural view of the dust-preventing member 1965R shown in FIG. 11 when cut along a YZ plane.

As shown in these drawings, the dust-preventing member 1965R holds the liquid crystal modulation element 925R and the transparent plates 962R and 963R. The dust-preventing member 1965R has an intermediate frame 30, a second outer frame 31 serving as a light outgoing side outer frame that is detachably fixed to the light outgoing side of the intermediate frame 30, a first outer frame 32 serving as a light incident side outer frame that is detachably fixed to the light incident side of the intermediate frame 30, and a spacer 33 arranged between the liquid crystal modulation element 925R and the transparent plate 963R. The liquid crystal modulation element 925R and the transparent plate 963R are held between the intermediate frame 30 and the second outer frame 31, and the transparent plate 962R is held between the intermediate frame 30 and the first outer frame 32.

The liquid crystal modulation element 925R has a lower step surface 9254R at its end portion of the light incident surface. A flexible cable 9253R for wiring extends from above the liquid crystal modulation element 925R.

The intermediate frame 30 is a rectangular frame, and has a lower step surface 303 at its inside edge portion on the light outgoing surface side of the frame portion. The step surface 9254R of the liquid crystal modulation element 925R is in contact with a surface 302 on the light outgoing side of the frame portion, and an edge portion of the higher light outgoing surface of the liquid crystal modulation element 925R is in contact with the step surface 303 that is formed on the intermediate frame 30. That is, contact surfaces 302 and 303 for the light incident surface that are in contact with a part of the light outgoing surface of the liquid crystal modulation element 925R are formed on the light outgoing side of the intermediate frame 30.

In addition, a pair of length-side wall portions 304 extending along the length-side side surfaces of the liquid crystal modulation element 925R and a pair of width-side wall portions 305 extending along the width-side side surfaces of the liquid crystal modulation element 925R are formed on the outer end of the frame portion of the intermediate frame 30. The length-side wall portions 304 extend to the positions where the leading ends thereof are equal to the light outgoing surface of the liquid crystal modulation element 925R. These length-side wall portions 304 are opposed to the length-side side surfaces of the liquid crystal modulation element 925R at a predetermined distance.

The leading ends of the width-side wall portions 305 extend to the width-side side surfaces of the transparent plate 936R across the width-side side surfaces of the liquid crystal modulation element 925R. A contact surface 306 for the light valve side surface contacting the width-side side surface of the liquid crystal modulation element 925R, and a contact surface 307 for the transparent plate side surface contacting the width-side side surfaces of the transparent 963R are formed on the width-side wall portions 305. In this embodiment, the contact surface 306 for the light valve side surface and the contact surface 307 for use in the transparent plate side surface are formed on the same plane.

The spacer 33 is a rectangular frame having a constant thickness. The lengthwise size of the spacer 33 is set substantially equal to that of the liquid crystal modulation element 925R, and the width-side side surfaces of the spacer 33 are in contact with the contact surface 307 for the transparent plate side surface (the contact surface 306 for the light valve side surface). Projections 331 extending towards the light incident side are formed on the length-side frame portions of the spacer 33. The projections 331 are inserted between the length-side side surfaces of the liquid crystal modulation element 925R and the length-side wall portions 304 formed on the intermediate frame 30.

In addition, projections 332 extending towards the light outgoing side are formed on the length-side frame portion of the spacer 33. The transparent plate 963R is held by the projections 332 from the vertical direction (the Y direction).

The second outer frame 31 is a rectangular frame having the constant thickness thinner than the spacer 33. The overall surface of the light incident side of the frame portion of the outer frame 31 is a pressure surface 311 for pressing the light outgoing surface of the transparent plate 963R towards the intermediate frame 30. In addition, the second outer frame 31 has engaging pawls 312 formed on four corners thereof that extend along the side surfaces of the width-side frame portion of the intermediate frame 30. In contrast, the intermediate frame 30 has engaging projections 341 formed at the positions corresponding to the engaging pawls 312 that can engage with the engaging pawls 312.

A procedure of assembling the liquid crystal modulation element 925R, the spacer 33, the transparent plate 963R and the second outer frame 31 onto the intermediate frame 30 will now be described.

Figure 13A:
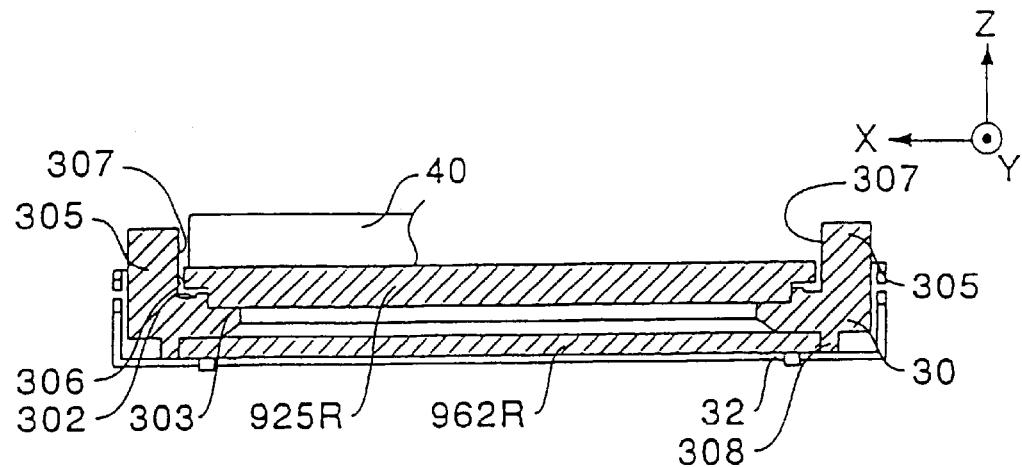
FIGS. 13(A)–(B) are illustrations showing a state in which a roller moves on a light outgoing surface of a liquid crystal modulation element.
Figure 13B:
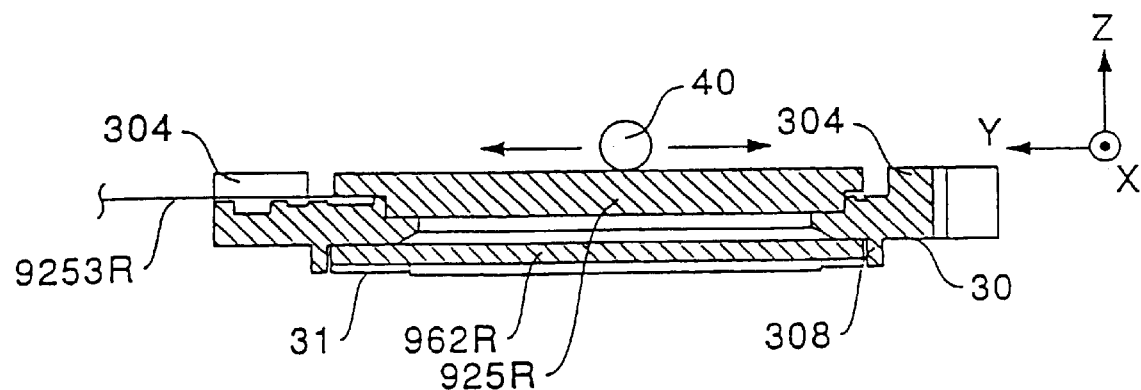

First, the liquid crystal modulation element 925R is inserted between a pair of width-side wall portions 305 formed on the intermediate frame 30. At this time, the liquid crystal modulation element 925R is inserted so that the edge portion of the light incident surface of the liquid crystal modulation element 925R abuts against the step surface (light incident-side contact surface) 303 of the intermediate frame 30. This allows the liquid crystal modulation element 925R to be arranged at a predetermined position on the intermediate frame 30 by the contact surfaces 302 and 303 for the light incident surface and the contact surface 306 for the light valve side surfaces. In this state, as shown in FIG. 13(A), the width-side wall portions 305 extend towards the light outgoing side across the width-side side surfaces of the liquid crystal modulation element 925R. On the other hand, as shown in FIG. 13(B), the leading ends of the length-side wall portions 304 and the light outgoing surface of the liquid crystal modulation element 925R are positioned on substantially the same plane. In this state, the liquid crystal modulation element 925R is not completely fixed to the intermediate frame 30, and can be easily removed.

Next, the spacer 33 is superposed on the light incident surface of the liquid crystal modulation element 925R along the width-side wall portions 305 of the intermediate frame 30. At this time, if the projections 331 formed on the spacer 33 are to be inserted between the length-side side surfaces of the liquid crystal modulation element 925R and the length-side wall portions 304 of the intermediate frame 30, the spacer 33 is arranged at a predetermined position on the light outgoing surface of the liquid crystal modulation element 925R.

Then, the transparent plate 963R is superposed on the spacer 33 along the width-side wall portions 305 of the intermediate frame 30. At this time, if the transparent plate 963R is to be positioned between the projections 332 formed on the spacer 33, the transparent plate 963R is arranged on a predetermined position, so that the alignment of the intermediate frame 30, the liquid crystal modulation element 925R, the spacer 33 and the transparent plate 963R in relation to one another is defined. When the transparent plate 963R is merely superposed on the spacer 33, they are not completely fixed to the intermediate frame 30, and can be removed at any time.

After that, the second outer frame 31 is attached to the intermediate frame 30 in such a manner that the engaging pawls 312 formed on the second outer frame 31 engage with the engaging projections 341 formed on the intermediate frame 30. This allows the light outgoing surface of the transparent plate 963R to be pressed towards the intermediate frame 30 by the pressure surface 311 of the second outer frame 31, so that all of the transparent plate 963R, spacer 33 and liquid crystal modulation element 925R are pressed from the light outgoing side onto the intermediate frame 30. Consequently, the liquid crystal modulation element 925R, the spacer 33 and the transparent plate 963R are held between the intermediate frame 30 and the second outer frame 31, and the alignment relation thereof is maintained.

The structure of the light incident side of the intermediate frame 30 will now be described. The intermediate frame 30 includes a wall portion 308 extending along the side surfaces on the periphery of the transparent plate 962R on the light incident side thereof, and a contact surface 309 for the light outgoing surface that is in contact with the edge portion of the light outgoing surface of the transparent plate 962R. A contact surface 310 for the transparent plate side surface that is in contact with the side surface of the transparent plate 962R is formed on the wall portion 309.

The first outer frame 32 is of an identical shape with the outer frame 31 on the light incident side. That is, the first outer frame 32 is a rectangular frame having a constant thickness thinner than the spacer 33. The overall surface on the light outgoing side of the frame portion of the first outer frame 32 is a pressure surface 321 for pressing the light incident surface of the transparent plate 962R to the intermediate frame 30. In addition, the first outer frame 31 has engaging pawls 322 formed on four corners thereof that extend in the thickness direction of the width-side frame portion of the intermediate frame 30. In contrast, the intermediate frame 30 has engaging projections 342 formed at the positions corresponding to the engaging pawls 322 that can engage with the engaging pawls 322.

Therefore, when the transparent plate 962R is fitted to a portion enclosed by the wall portion 308 formed on the intermediate frame 30, the edge portion of the light incident surface of the transparent plate 962R strikes the contact surface 309 for the light outgoing surface of the intermediate frame 30. In addition, the peripheral side surfaces of the transparent plate 962R abut against the contact surface 309 for the transparent plate side surface formed on the wall portion 308. This allows the transparent plate 962R to be arranged at a predetermined position on the intermediate frame 30, and a space from the light incident surface of the liquid crystal modulation element 925R is maintained. In this state, the transparent plate 962R is not completely fixed to the intermediate frame 30, and can be easily removed.

In this state, when the first outer frame 32 is fitted to the intermediate frame 30 so that the engaging pawls 322 formed on the first outer frame 32 engage with the engaging projections 342 formed on the intermediate frame 30, the transparent plate 962R is pressed by the pressure surface 321 of the first outer frame 32, and the transparent plate 962R is held between the intermediate frame 30 and the first outer frame 32. In addition, the space between the light incident surface of the liquid crystal modulation element 925R and the transparent plate 962R is shielded from the outside by the wall portion 308 formed on the intermediate frame 30.

When the liquid crystal modulation element 925R, and the transparent plates 962R and 963R are held by such a dust-preventing member 1965R, operability of rework such as replacement of components can be improved. That is, if the liquid crystal modulation element 925R and the transparent plates 962R and 963R are fixed to the intermediate frame 30 with an adhesion or the like, a step for cleaning the adhesive adhering to the components (the liquid crystal modulation element 925R and the transparent plates 962R and 963R) is required in the case of replacement thereof after separating them from the intermediate frame 30. However, if the above dust-preventing member 1965R is used, components can be easily replaced because the components such as the liquid crystal modulation element 925R and the like can be easily removed by removing the second outer frame 31 and first outer frame 32 at the time of replacement of components.

In the state where the liquid crystal modulation element 925R is arranged on the intermediate frame 30, while the leading ends of the length-side wall portions 304 formed on the intermediate frame 30 and the light outgoing surface of the liquid crystal modulation element 925R are positioned on substantially the same plane, the width-side wall portions 305 extend to the light outgoing side across the light outgoing surface of the liquid crystal modulation element 925R, as shown in FIGS. 13(A) and (B). Therefore, a roller 40 is put on the light outgoing surface of the liquid crystal modulation element 925R, and the roller 40 can be moved in one direction (the Y direction) by using the transparent plate-side contact surfaces 307 formed on the width-side wall portion 305 as guide surfaces.

An antireflection film (AR film) may be bonded to the light outgoing surface of the liquid crystal modulation element for the purpose of improving the light utilizing use efficiency. In this case, the AR film is placed on the light outgoing surface of the liquid crystal modulation element 925R and the roller 40 is moved in one direction as described above, whereby the AR film can be easily bonded to the light outgoing surface. In addition, since the roller 40 can be moved in one direction, the roller 40 can be easily moved, and air bubbles generated between the light outgoing surface and the AR film can be effectively eliminated.

Furthermore, when replacing the AR film to which dust is adhered, first, the second outer frame 31 is removed from the intermediate frame 30, and the transparent plate 963R and the spacer 33 are removed from the intermediate frame 30. After that, the AR film to which dust is adhered is separated from the light outgoing surface of the liquid crystal modulation element 925R and a new AR film is bonded with the above-described procedure. After the renewal of the AR film, the spacer 33 and the transparent plate 963R are superposed on the liquid crystal modulation element 925R, and the second outer frame 31 is fixed to the intermediate frame 30. This allows a renewal operation of the AR film to be completed. By using the intermediate frame 30 including the guide surfaces (the contact surface for the transparent plate 307, in this embodiment), the renewal operation of the AR film to the light outgoing surface of the liquid crystal modulation element 925 can be also easily performed.

Figure 14:
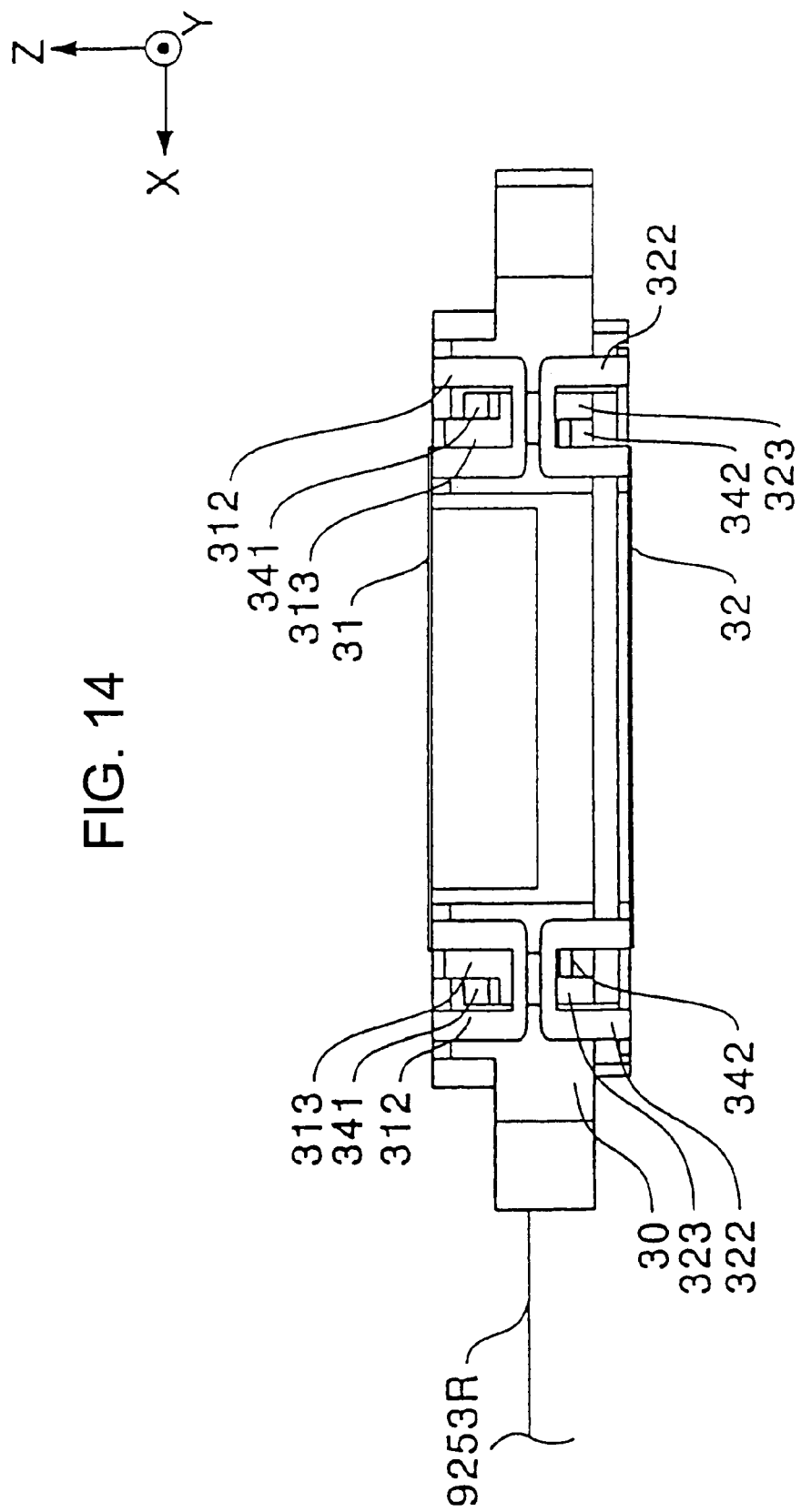
FIG. 14 is a plan view showing the engagement between engaging pawls and engaging projections.

FIG. 14 illustrates the engagement between the engaging pawls 312 and 322 and the engaging projections 341 and 342. As shown in this drawing, the engaging pawls 312 and 322 formed on the outer frames 31 and 32 have rectangular openings 313 and 323, respectively. Engaging projections 341 and 342 corresponding to the engaging pawls 312 and 322 are formed so that they are engaged with the rectangular openings 313 and 323 of the engaging pawls 312 and 322, and are located at positions shifted in the direction perpendicular (the X direction) to the thickness direction (the Z direction) of the intermediate frame 30.

Since it is difficult to form the intermediate frame on which the positions of match in the thickness direction of the respective engaging projections 341 and 342 using upper and lower frames, the engaging projections to be formed on the intermediate frame should be shifted in the direction perpendicular to the thickness direction using the first and second outer frames having different shapes. However, if an engagement mechanism in this embodiment is adopted, the intermediate frame can be easily formed and at the same time, commonality of components can be achieved by forming the first outer frame 32 and the second outer frame 31 into the same shape.

Figure 15:
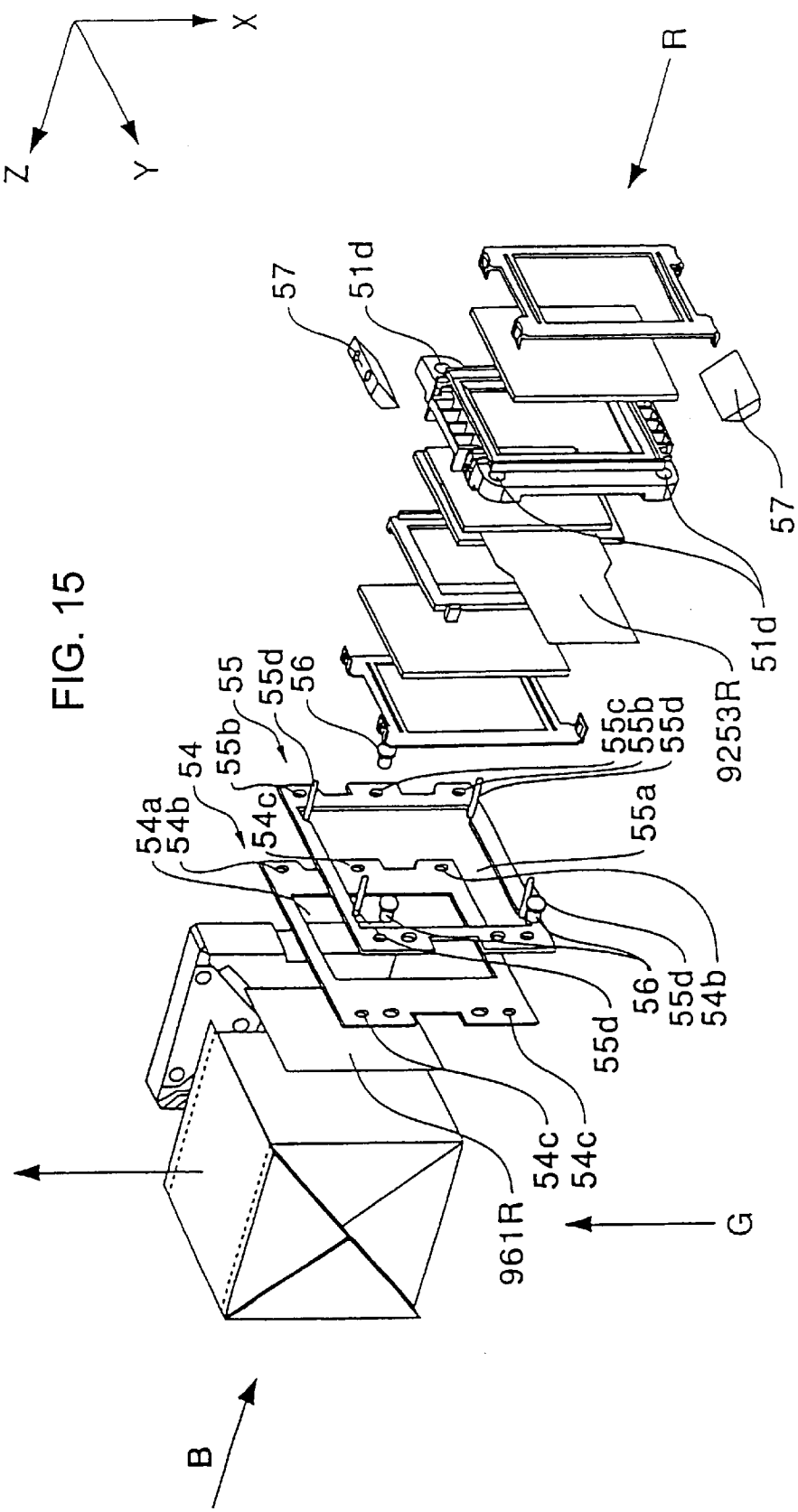
FIG. 15 is an exploded perspective view showing a state in which the dust-preventing member shown in FIG. 11 is attached to the color synthesizing prism.

The structure for attaching the dust-preventing member 1965R to the light incident surface 911R of the color synthesizing prism 910 is the same as that of the aforementioned dust-preventing member 965R. That is, as shown in FIG. 15, the dust-preventing member 1965R is fixed to the fixed frame plate 54 that is fixedly bonded to the light incident surface 911R of the color synthesizing prism 910. In addition, since the procedures of attaching the dust-preventing member 1965R to the color synthesizing prism 910 using the intermediate frame plate 55 and the fixed frame plate 54, and actions and effects thereof are the same as those of the dust-preventing member 965R, a description thereof will be omitted.

<Embodiment 2>

While the projection display device using a transmissive liquid crystal modulation element as the liquid crystal modulation element has been described in the embodiment 1, the present invention can be applied to a projection display device that uses a reflective liquid crystal modulation element as the liquid crystal modulation element. An example of a projection display device to which a reflective liquid crystal modulation element is adopted will be shown below.

Figure 16:
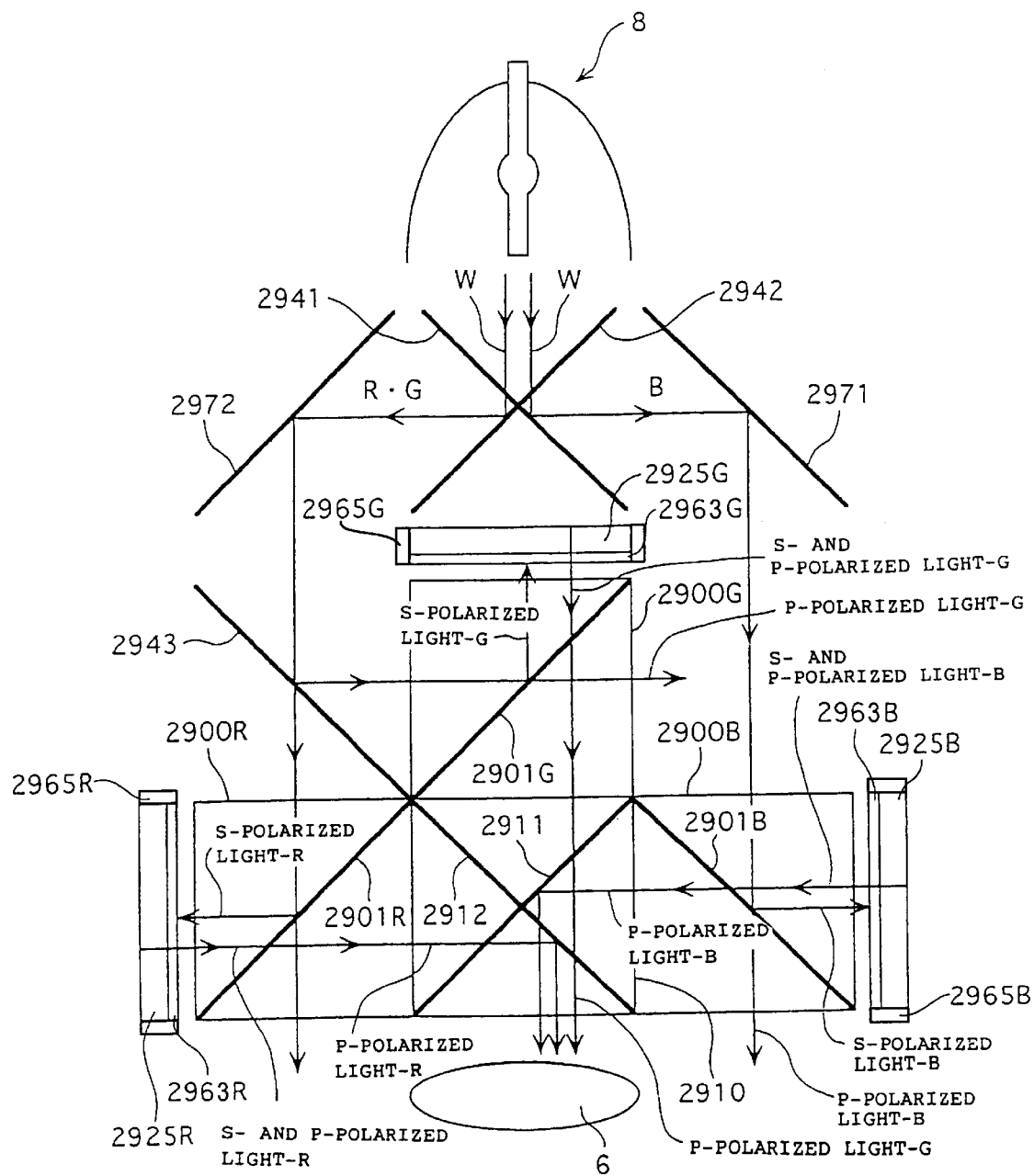
FIG. 16 is a schematic structural view of the surroundings of a liquid crystal modulation element of a projection display device according to an embodiment 2 of the present invention.

FIG. 16 is a schematic structural view of the surroundings of light valves in the projection display device of this embodiment. In FIG. 16, the projection display device includes a blue reflecting dichroic mirror 2941 and a red reflecting dichroic mirror 2942 that reflect illumination light emitted from a light source lamp unit 8. A blue light flux B contained in a light flux W is reflected at right angles by the blue reflecting dichroic mirror 2941 and then, is further reflected at right angles by a reflecting mirror 2971, and is incident on a first polarization beam splitter 2900B provided adjacent to a dichroic prism 2910.

This polarization beam splitter 2900B is formed of a prism having an s-polarized light flux-reflecting plane 2901B that is formed of a polarized light separation film for reflecting an s-polarized light flux and transmitting a p-polarized light flux. The polarization beam splitter 2900B bends an s-polarized light component of the blue light flux into 90° by the s-polarized light flux-reflecting plane 2901B, and allows the s-polarized light component to be incident on a light incident and outgoing surface of a reflective liquid crystal modulation element 2925B that is opposing one side of the polarization beam splitter 2900B.

Then, only a p-polarized light of the blue light flux, which is modulated by the liquid crystal modulation element 2925B and transmitted through the s-polarized light flux-reflecting plane 2901B, is emitted from the same light incident and outgoing surface to the dichroic prism 2910. Incidentally, a transparent plate 2963B is arranged on the side of the light incident and outgoing surface of the liquid crystal modulation element 2925B through a dust-preventing member 2965B.

On the other hand, a red light flux R and a green light flux G are first reflected at right angles by the red-green reflecting dichroic mirror 2942, and then further reflected at right angles by a reflecting mirror 2972.

After being transmitted through a green reflecting dichroic mirror 2941, the red light flux R is incident on a second polarization beam splitter 2900R that is provided on an opposite side to the first polarization beam splitter 2900B across the dichroic prism 2910. The second polarization beam splitter 2900R is formed of a prism having an s-polarized light flux-reflecting plane 2901R that is formed of a polarized light separation film for reflecting an s-polarized light flux and transmitting a p-polarized light flux.

The second polarization beam splitter 2900R bends an s-polarized light component of the red light flux into 90° by the s-polarized light flux-reflecting plane 2901R, and allows the s-polarized light component to be incident on a light incident and outgoing surface of a reflective liquid crystal modulation element 2925R that is opposing one side of the polarization beam splitter 2900R.

Then, only p-polarized light of the red light flux, which is modulated by the liquid crystal modulation element 2925R and transmitted through the s-polarized light flux-reflecting plane 2901R, is emitted from the same light incident and outgoing surface to the dichroic prism 2910. Incidentally, a transparent plate 2963R is arranged on the light incident side and outgoing surface side of the liquid crystal modulation element 2925R through a dust-preventing member 2965R.

After being reflected by a green reflecting dichroic mirror 2943, the green light flux G is incident on a third polarization beam splitter 2900G that is provided on one side of the dichroic prism 2910. The third polarization beam splitter 2900G is formed of a prism having an s-polarized light flux-reflecting plane 2901G that is formed of a polarized light separation film for reflecting an s-polarized light flux and transmitting a p-polarized light flux. This polarization beam splitter 2900G bends an s-polarized light component of the green light flux into 90° by the s-polarized light flux-reflecting plane 2901G, and allows the s-polarized light component to be incident on a light incident and outgoing surface of a reflective liquid crystal modulation element 2925G that is opposing one side of the polarization beam splitter 2900G.

Then, only p-polarized light of the green light flux, which is modulated by the liquid crystal modulation element 2925G and transmitted through the s-polarized light flux-reflecting plane 2901G, is emitted from the same light incident and outgoing surface to the dichroic prism 2910. Incidentally, a transparent plate 2963G is arranged on the light incident side and outgoing surface side of the liquid crystal modulation element 2925G through a dust-preventing member 2965G.

As described above, the light fluxes B, R and G modulated through the respective liquid crystal modulation elements 2925B, 2925R and 2925G are incident on the dichroic prism 2910, where they are synthesized. The synthesized color image is enlarged and projected through a projection lens unit 6 onto a screen that is placed at a predetermined position.

In such a projection display device using the reflective liquid crystal modulations 2925R, 2925G and 2925B, since light outgoing surfaces of the reflective liquid crystal modulation elements 2925R, 2925G and 2925B are protected by the transparent plates 2963R, 2963G and 2963B, it is possible to restrict the increase in temperature of the liquid crystal modulation elements 925R, 925G and 925B and to prevent the deterioration of the optical properties thereof.

Furthermore, the surfaces of such transparent plates 2963R, 2963G and 2963B may be coated with a surface-active agent (surfactant), or treated for electrostatic protection. Since this makes it difficult for dust to adhere to the surfaces of the transparent plates 2963R, 2963G and 2963B, the adhesion of dust can be prevented more effectively.

<Other Embodiments>

While the projection display device having three liquid crystal modulation elements for modulating three color lights, respectively, is described in the above embodiments, a projection display device to which the present invention is applied is not limited to the above-described device, for example, it may use only a single liquid crystal modulation element. In addition, the projection display devices are divided into two types, a front type that performs projection from the side on which the screen is observed, and a rear type that performs projection from the side opposite to the screen observing side, and the present invention is applicable to either of the types.

INDUSTRIAL APPLICABILITY

The present invention can be utilized as a projection display device that optically processes a light flux emitted from a light source and enlarges and projects an image onto a projection plane, such as a video projector having liquid crystal modulation elements.

What is claimed is:

1. An optical modulation apparatus that modulates a light flux emitted from a light source according to image information, the optical modulation apparatus comprising:
   an optical modulation device;
   a transparent plate provided on at least one side of the optical modulation device with a space therebetween;
   at least one polarizer spaced apart from the transparent plate with no structural element disposed therebetween such that transmission of heat generated by the at least one polarizer to the transparent plate is reduced;
   a dust-preventing member including a frame body and an outer frame detachably fixed to the frame body and shielding the space from the outside, the optical modulation device and the transparent plate being held by the frame body and the outer frame with the space therebetween.

2. The optical modulation apparatus according to claim 1, said frame body being formed of resin containing glass fiber.

3. The optical modulation apparatus according to claim 1, said frame body being made of metal.

4. The optical modulation apparatus according to claim 1, further comprising:
   a polarizer bonded to said transparent plate.

5. The optical modulation apparatus according to claim 1, at least one surface of said transparent plate being coated with a surface-active agent, or treated for electrostatic protection.

6. A projector comprising:
   a light source;
   an optical modulation device that modulates a light flux emitted from the light source according to image information;
   a projection lens that enlarges and projects the light modulated by said optical modulation device;
   a transparent plate provided on a side of a light outgoing surface of said optical modulation device with a space therebetween;
   at least one polarizer spaced apart from the transparent plate with no structural element disposed therebetween such that transmission of heat generated by the at least one polarizer to the transparent plate is reduced;
   a dust-preventing member including a frame body and an outer frame detachably fixed to the frame body and shielding the space from the outside, the optical modulation device and the transparent plate being held by the frame body and the outer frame with the space therebetween.

7. The projector according to claim 6,
   said frame body including a light incident contact surface that contacts a part of the light incident surface of said optical modulation device, an optical modulation device side contact surface that contacts a side surface of said optical modulation device and a transparent plate side contact surface that contacts a side surface of said transparent plate, and
   said light outgoing-side outer frame including a pressure surface that presses a part of a light outgoing surface of said transparent plate towards said frame body.

8. The projector according to claim 7, said frame body having a guide surface formed thereon that places a roller on the light outgoing surface of said optical modulation device and moves said roller in one direction.

9. The projector according to claim 6, further comprising:
   an antireflection film provided on a surface of said transparent plate.

10. The projector according to claim 6,
    said optical modulation device being a transmissive optical modulation device, and said projector further comprising a light incident-side transparent plate provided on a side of a light incident surface of said transmissive optical modulation device.

11. The projector according to claim 10, further comprising:
    a space between said light incident-side transparent plate and the light incident surface of said transmissive optical modulation device, the space being shielded from the outside by said dust-preventing member.

12. The projector according to claim 11, further comprising:
    a light incident-side outer frame detachably fixed to the light incident side of said frame body of said dust preventing member,
    said light incident-side outer frame including a pressure surface that presses a part of a light incident surface of said light incident-side transparent plate towards said frame body, and
    said frame body including a light outgoing contact surface that contacts a part of the light outgoing surface of said light incident-side transparent plate, and a transparent plate side contact surface that contacts a side surface of said light incident-side transparent plate.

13. The projector according to claim 12,
    said light incident-side outer frame and said light outgoing-side outer frame having a same shape and include engaging pawls extending along side surface of said frame body, said frame body including engaging projections corresponding to said engaging pawls, respectively, and the respective engaging projections being formed at positions shifted in a direction perpendicular to a thickness direction of said frame body.

14. The projector according to claim 6,
    said frame body being formed of resin containing glass fiber.

15. The projector according to claim 6,
said frame body being made of metal.
16. The projector according to claim 6, optical modulation device further comprising:
a polarizer bonded to said transparent plate.
17. The projector according to claim 6,
at least one surface of said transparent plate being coated with a surface-active agent, or treated for electrostatic protection.
18. A projector that separates a light flux emitted from a light source into a plurality of color light fluxes, modulates the color light fluxes according to image information through an optical modulation device, synthesizes the color light fluxes modulated by said optical modulation device by a color synthesizer, and enlarges and projects light synthesized by said color synthesizer through a projection lens, said projector comprising:
a transparent plate provided on a side of a light outgoing surface of said optical modulation device with a space therebetween;
at least one polarizer spaced apart from the transparent plate with no structural element disposed therebetween such that transmission of heat generated by the at least one polarizer to the transparent plate is reduced;
a dust-preventing member including a frame body and an outer frame detachably fixed to the frame body and shielding the space from the outside, the optical modulation device and the transparent plate being held by the frame body and the outer frame with the space therebetween;
a fixed frame plate fixed on a light incident surface of said color synthesizer; and
an intermediate frame plate removably fixed to said fixed frame plate,
said frame body being fixed to said intermediate frame plate.
19. The projector according to claim 18, further comprising:
a positioning member that positions said optical modulation device by defining a mounting position of said frame body.
20. The projector according to claim 18,
said optical modulation device being a transmissive optical modulation device, said transparent plate being also provided on a light incident surface side of said transmissive optical modulation device, said transparent plate being also held by said frame body, and a space between said transparent plate and the light incident surface of said transmissive optical modulation device being shielded from the outside by said frame body.
21. The projector according to claim 18, further comprising:
a polarizer provided on a light incident surface of said color synthesizer, and a bonded surface of said fixed frame plate to said light incident surface being not completely covered with said polarizer.
22. The projector according to claim 18,
at least one surface of said transparent plate being coated with a surface-active agent, or treated for electrostatic protection.
23. The projector according to claim 18, further comprising:
a polarizer bonded to said transparent plate.
24. The projector according to claim 18,
said frame body being formed of resin containing glass fiber.

25. The projector according to claim 18,
said frame body being made of metal.
26. A projector comprising:
a light source;
an optical modulation device that modulates a light flux emitted from the light source according to image information;
a transparent plate provided on a side of a light outgoing surface of said optical modulation device with a space therebetween;
at least one polarizer spaced apart from the transparent plate with no structural element disposed therebetween such that transmission of heat generated by the at least one polarizer to the transparent plate is reduced;
a dust-preventing member including a frame body and an outer frame detachably fixed to the frame body and shielding the space from the outside, the optical modulation device and the transparent plate being held by the frame body and the outer frame with the space therebetween;
a power supply device;
an interface substrate having an input-output interface circuit;
a control substrate that controls driving of the apparatus; and
an outer casing that accommodates the light source, the optical modulation device, the transparent plate, the dust-preventing member, the power supply device, the interface substrate, and the control substrate.
27. A projector comprising:
a plurality of optical modulation devices, each optical modulation device modulates a color light according to image information;
a color synthesizer that synthesizes the color lights modulated by the optical modulation devices;
a transparent plate provided on a side of a light outgoing surface of each optical modulation device with a space therebetween;
at least one polarizer spaced apart from the transparent plate with no structural element disposed therebetween such that transmission of heat generated by the at least one polarizer to the transparent plate is reduced;
a dust-preventing member including a frame body and an outer frame detachably fixed to the frame body and shielding the space from the outside, the optical modulation device and the transparent plate being held by the frame body and the outer frame with the space therebetween;
a power supply device;
an interface substrate having an input-output interface circuit;
a control substrate that controls driving of the apparatus; and
an outer casing that accommodates the light source, the optical modulation devices, the transparent plate, the dust-preventing member, the power supply device, the interface substrate, and the control substrate.
28. The optical modulation apparatus according to claim 1, said frame body including a light incident contact surface that contacts a part of a light incident surface of said optical modulation device, an optical modulation device side contact surface that contacts a side surface of said optical modulation device and a transparent plate side contact surface that contacts a side surface of said transparent plate, and said outer frame including a pressure surface that presses a part of a light outgoing surface of said transparent plate towards said frame body.

29. The projector according to claim 18, said frame body including a light incident contact surface that contacts a part of a light incident surface of said optical modulation device, an optical modulation device side contact surface that contacts a side surface of said optical modulation device and a transparent plate side contact surface that contacts a side surface of said transparent plate, and said outer frame including a pressure surface that presses a part of a light outgoing surface of said transparent plate towards said frame body.

30. The projector according to claim 27, said frame body including a light incident contact surface that contacts a part of a light incident surface of said optical modulation device, an optical modulation device side contact surface that contacts a side surface of said optical modulation device and a transparent plate side contact surface that contacts a side surface of said transparent plate, and said outer frame including a pressure surface that presses a part of a light outgoing surface of said transparent plate towards said frame body.

* * * * *